(12) United States Patent
Hafezi

(10) Patent No.: US 8,968,085 B2
(45) Date of Patent: Mar. 3, 2015

(54) NETWORKED GAMING SYSTEM AND METHOD

(75) Inventor: Jonathan K. Hafezi, Charlotte, NC (US)

(73) Assignee: Integrated Systems Design, Inc., Charlotte, NC (US)

( * ) Notice: Subject to any disclaimer, the term of this patent is extended or adjusted under 35 U.S.C. 154(b) by 222 days.

(21) Appl. No.: 13/453,756

(22) Filed: Apr. 23, 2012

(65) Prior Publication Data

US 2013/0244771 A1    Sep. 19, 2013

Related U.S. Application Data

(63) Continuation-in-part of application No. 13/441,889, filed on Apr. 8, 2012, which is a continuation-in-part of application No. 13/420,350, filed on Mar. 14, 2012, now Pat. No. 8,668,589.

(51) Int. Cl.
*A63F 13/00* (2014.01)

(52) U.S. Cl.
USPC ............................................... 463/29; 463/42

(58) Field of Classification Search
CPC ............ G07F 17/3227; G07F 17/3241; G07F 17/3272
USPC ......................................... 463/29, 40, 42, 43
See application file for complete search history.

(56) References Cited

U.S. PATENT DOCUMENTS

| | | | | |
|---|---|---|---|---|
| 2005/0091338 | A1* | 4/2005 | de la Huerga | 709/217 |
| 2007/0094721 | A1* | 4/2007 | Nguyen et al. | 726/9 |
| 2007/0265050 | A1* | 11/2007 | Baazov | 463/13 |
| 2008/0064494 | A1* | 3/2008 | Schneier et al. | 463/29 |
| 2009/0203432 | A1* | 8/2009 | Carter, Sr. | 463/25 |

* cited by examiner

*Primary Examiner* — James S McClellan
(74) *Attorney, Agent, or Firm* — Thibault Patent Group

(57) ABSTRACT

A method and apparatus for allowing remote players to participate in live games offered by a central gaming server. In one embodiment, a method comprising receiving authentication information from a person wishing to participate in the live games offered by the central gaming server, storing the authentication information in a memory, receiving an authentication request from an individual over a network interface, the authentication request comprising authentication information sent by the individual wishing to participate in the live games, comparing the authentication information in the authentication request to the authentication information in the memory by a processor, receiving a scaled commission determined by the authorized authentication center, the scaled commission comprising a portion of a fee received from game players during game play, and granting access the individual access to the central gaming server if the authentication information in the authentication request matches the authentication information in the memory.

20 Claims, 14 Drawing Sheets

NETWORKED GAMING SYSTEM AND METHOD

CLAIM OF PRIORITY

This application is a continuation-in-part of, and claims priority to, U.S. patent application Ser. No. 13/441,889, filed on Apr. 8, 2012, which is a continuation-in-part of U.S. patent application Ser. No. 13/420,350 now U.S. Pat. No. 8,668,589 and to U.S. patent application Ser. No. 13/420,377, both filed on Mar. 14, 2012, both owned by the inventor of the present application.

BACKGROUND

1. Field of Use

The present application relates generally to gaming devices and systems, and more specifically to gaming devices interconnected by a network.

2. Description of the Related Art

A variety of Internet-based games of chance and/or skill has gained widespread popularity over the past several years. Such games include a wide variety of poker games, such as Texas Hold-'em, draw poker, stud poker, etc., as well as non-poker type games such as Keno, Bingo, Roulette, Craps, as well as other games. Players of such games typically access a central server via a personal computer connected to the Internet. Each player typically sets up an account with a preferred gaming website and funds the account with money using a variety of methods, such as wire transfer or credit card. After establishing an account, a player may select a game that they wish to play from a variety of games typically offered by the gaming website. Players may be given a choice of where to "sit" at a particular virtual game table and are generally able to receive electronic representations of playing cards, reels, dice, Bingo balls, keno numbers, etc. in accordance with the selected game. As game play progresses, players may place one or more wagers in accordance with the game based on funds available in their account balance.

While the above-described scenario provides a convenient and comfortable way for players to participate in games of chance and/or skill, there are several drawbacks. In the United States, for example, Internet-based wagering is generally considered illegal and, as a result, players that participate in such Internet-based gaming risk fines and/or jail time if discovered. Website owners/operators offering Internet-based gaming must be located outside the United States to avoid prosecution. In addition, there is no way to enforce minimum age requirements for game players (typically age 21 in the United States for casino gambling).

Casino-based gaming has been popular for decades. Gaming gained a foothold in the United States in Las Vegas in the early 1930's, and has spread more recently to cities such as Atlantic City, N.J., Detroit, and Michigan. Gaming has gained widespread acceptance and may be found in virtually every state in the United States in the form of riverboats, Indian Casinos, card rooms, bingo halls, lotteries, and racetracks. Often, these authorized gaming establishments offer card rooms that allow patrons to play a variety of card games against each other (such as in poker) or against a common entity, such as "the house" or "the dealer" (such as in Blackjack). They may also offer other games of chance and/or skill that are played at the authorized gaming establishment, such as roulette, craps, blackjack, keno, bingo, and so on, where patrons interact with games located on the premises.

There are several problems associated with casino-based gaming. First and foremost, while casinos and gaming venues have become dramatically more prevalent, individuals must still physically travel to these establishments to participate in gaming activities. Often, this factor alone discourages potential gamers from participating in games of chance and/or skill. This factor also inhibits spontaneity, causing potential gamers from refraining from participation. Another disadvantage of casino-based gaming, especially "live" poker found in card rooms, is that players may feel intimated by other, more seasoned players and, thus, avoid such live play.

It would be desirable to offer gaming to individuals that avoids the problems of Internet-based gaming and the problems of casino-based gaming.

SUMMARY

The embodiments described herein relate to a method, system, and apparatus for allowing remote players to participate in live games offered by a central gaming server. In one embodiment, a method is described, comprising receiving authentication information from a person wishing to participate in the live games offered by the central gaming server, storing the authentication information in a memory, receiving an authentication request from an individual over a network interface, the authentication request comprising authentication information sent by the individual wishing to participate in the live games, comparing the authentication information in the authentication request to the authentication information in the memory by a processor, receiving a scaled commission determined by the authorized authentication center, the scaled commission comprising a portion of a fee received from game players during game play, and granting access the individual access rights to the central gaming server if the authentication information in the authentication request matches the authentication information in the memory.

In another embodiment, an apparatus a memory for allowing remote players to participate in live games offered by a central gaming server is described, comprising a memory for storing processor-executable instructions and for storing authentication information from a person wishing to participate in the live games offered by the central gaming server, a processor for executing the processor-executable instructions that, when executed by the processor, cause the apparatus to receive the authentication information from the person wishing to participate in the live games offered by the central gaming server, store the authentication information in the memory, receive an authentication request from an individual over a network interface, the authentication request comprising authentication information sent by the individual wishing to participate in the live games, compare the authentication information in the authentication request to the authentication information in the memory by a processor, grant access the individual access rights to the central gaming server if the authentication information in the authentication request matches the authentication information in the memory, and receive a scaled commission determined, the scaled commission comprising a portion of a fee received from game players during game play, and a network interface for sending and receiving information between the apparatus and the individual.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
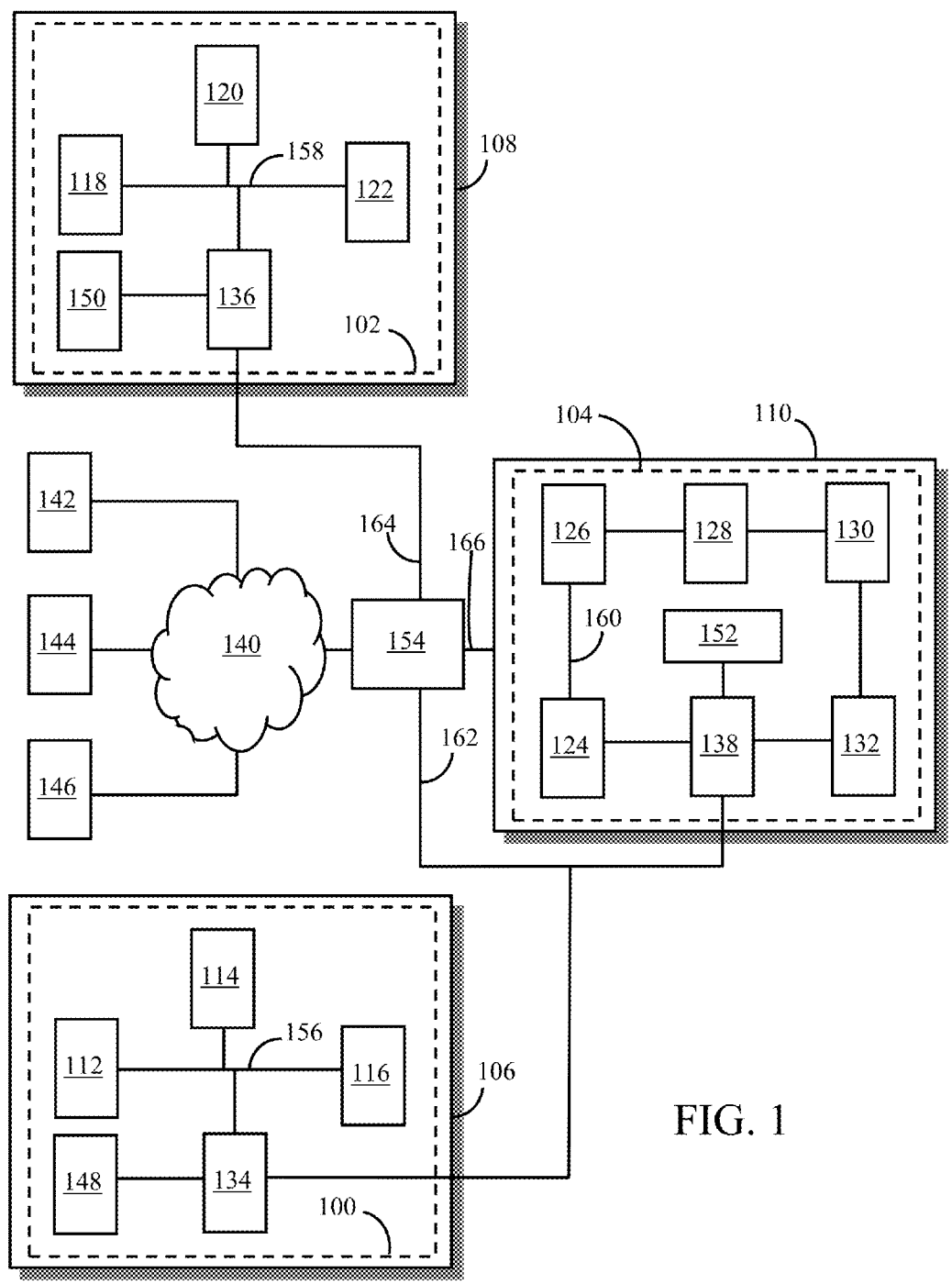
FIG. 1 illustrates a networked gaming system in accordance with the teachings herein, used by single or multiple authorized gaming establishments.

The present description relates to networked gaming systems and methods. Such network gaming systems may be used by one or more authorized gaming establishments to provide "live" game play to individuals via electronic gaming devices located on each authorized gaming establishment's property. "Live" game play may refer to an ability for an individual to play games such as poker, blackjack, craps, roulette, Pai-gow, keno, lotto, bingo, in real-time or near real-time with and/or against other human beings and/or a house entity located, in one embodiment, within the same authorized gaming establishment, or, in another embodiment, located at another authorized gaming establishment, or, in yet another embodiment, remotely located from any authorized gaming establishment, such as an individual participant in game play using a home computer via the Internet, or, in still another embodiment, any combination of the foregoing.

One of the advantages of provided a networked gaming system where electronic gaming devices are located on the premises of authorized gaming establishments is that gaming can be regulated in accordance with local, state, and federal laws. For example, many jurisdictions require a minimum age to participate in gaming, typically 21 years of age. By locating electronic gaming devices inside authorized gaming establishments, a higher degree of compliance with such laws may be achieved. In addition, the chances of cheating or tampering with electronic gaming devices are greatly reduced by locating electronic gaming devices within the confines of an authorized gaming establishment. Such establishments typically must meet a host of requirements before becoming authorized to provide gaming to individuals, not the least of which is providing a minimum level of security to ensure that cheating and tampering with electronic gaming devices do not occur.

Another advantage of providing a networked gaming system inside established authorized gaming establishments is that it may attract individuals who would normally be reluctant to participate in live, head-to-head game play against others. For example, many individuals are intimidated to play live poker against other players inside a card room, due to the confrontational nature of such game play. By provided electronic gaming devices to such individuals, they may engage in "live" poker games without having to directly confront other players visually or verbally.

As used herein, the term "electronic gaming device" refers to an electronic or electro-mechanical device that allows a player to play one or more games, either against other players, against "the house", e.g., authorized gaming establishment, or a combination of both. Such electronic gaming devices allow an individual to play games such as poker (in any number of its forms), roulette, craps, bingo, keno, slots, blackjack, and other games of chance and/or skill in real time or near real-time against other, real individuals and/or a house entity. In one embodiment, electronic gaming devices are manufactured in accordance with a set of standards set by the Regulations of the Nevada Gaming Commission in, for example, "Technical Standards for Gaming Devices and On-Line Slot Systems".

The term "live-play" refers to real time or near real-time game play among/between human beings, each operating a respective electronic gaming device.

The term "authorized gaming establishment" refers to herein as any place of business that has been authorized by any local, state, federal, or other governmental body, to provide gaming services to individuals. Such establishments may include traditional casinos, Indian casinos, bingo parlors, card rooms, racetracks, riverboats, bars, airports, restaurants, and virtually any other establishment that is authorized to provide gaming to its customers.

FIG. 1 illustrates networked gaming systems 100, 102, and 104, each located on the premises of authorized gaming establishments 106, 108, and 110, respectively. In one embodiment, these gaming system operate independently from one another. In another embodiment, these gaming systems are inter-related to each other via server 154, as explained in greater details below. It should be understood that in other embodiments, a greater or fewer number of authorized gaming establishments could be used, more than one networked gaming system could be located within a single authorized gaming establishment, and other variations regarding the number and placement of networked gaming systems and/or authorized gaming establishments.

Each authorized gaming system shown in FIG. 1 comprises one or more electronic gaming devices. Shown in FIG. 1 are electronic gaming devices 112, 114, and 116 located on the premises of authorized gaming establishment 106, electronic gaming devices 118, 120, and 122 located on the premises of authorized gaming establishment 108, and electronic gaming devices 124, 126, 128, 130, and 132 located on the premises of authorized gaming establishment 110. Each of the electronic gaming devices allows an individual to participate in one or more games of chance and/or skill, either against other individuals using any of the other electronic gaming devices, against "the house", e.g., authorized gaming establishment, or a combination of both. Such electronic gaming devices allow an individual to play games such as poker (in any number of its forms), roulette, craps, bingo, keno, slots, blackjack, and other games of chance and/or skill. Although FIG. 1 illustrates a particular number of electronic gaming devices associated with each networked gaming system, it should be understood that in other embodiments, a greater or fewer number of electronic gaming devices may be used in association with each networked gaming system.

Each networked gaming system 106, 108, and 110 additionally comprises a server 134, 136, and 138, respectively, that are networked to their respective electronic gaming devices via communication medium 156, 158, and 160, respectively. The communication medium may comprise air (in the case of wireless networking), electrical or fiber optic cable, or any other well-known way to allow communications between/among servers and their respective electronic gaming devices. Each of the networked gaming system may use the same, or different, communication medium than other networked gaming systems. The servers communicate with their respective electronic gaming devices over their respective communication mediums, typically using well-known digital communication protocols such as TCP/IP, RS-232, or other digital communication protocols well known in the art.

Each server performs a variety of tasks necessary for game play between and among individuals at different electronic gaming devices. Although each of the servers 134, 136, and 138 are shown co-located with their respective electronic gaming devices, they could be located at a different location than their respective gaming devices, for example, in another jurisdiction, connected to their respective electronic gaming devices via the Internet.

Each networked gaming system 100, 102, and/or 104 may additionally comprise a slot club card server, the slot club card server for tracking player playing characteristics, such as the amount of time a player plays a particular game, a total amount that a player has wagered in a given time frame, an average number of wagers, an average wager size, a number of times that a player has "gone all in", and other characteristics. Such slot club card servers are well known in the art and are shown in FIG. 1 as slot club card servers 148, 150, and 152.

Players typically register with the slot club card server in each authorized gaming establishment that they wish to play in. In return, they are typically given a "player's card" in return. The player's card may then be inserted by the player into a selected electronic gaming device prior to game play. The slot club card server receives an indication that the player has begun operating the electronic gaming device, and the slot club card server may then be provided information pertaining to time played, wagers placed, etc. This information is stored in an electronic memory inside the slot club card server and may be analyzed by the authorized gaming establishment for marketing purposes, for general business purposes, for offering players rewards or "comps", or other purposes.

Often, an award is given to players whose characteristics meet a predetermined minimum criterion. For example, players who play 10 hours of total game play at any one of the electronic gaming devices within authorized gaming establishment 106 may receive a free buffet dinner or overnight stay in a hotel room.

In one embodiment, a player of an electronic gaming device playing a game against other players at different electronic gaming devices may be given an award if the player places a predetermined number of "all-in" bets. An all-in bet is when a player places a bet during a round of game play where all of the player's available "chips" are wagered at one time. This type of bet is most commonly used in poker. If any player places a predetermined number of all-in bets within a predetermined time frame, such as 30 all-in bets in a day, then those players may receive a free dinner, room, or other award.

Of course, other types of criteria could be tracked to award goods and services to players. For example, an award could be given to players who win a predetermined number of jackpots or tournaments. These results may be tracked by the slot club card server to determine when a predetermined number of victories have been achieved. An award could be given to players who lose a certain number of hands, or lose a predetermined number of hands in a row as a consolation prize.

As mentioned above, in one embodiment, each networked gaming system typically operates independently from one another. For example, individuals playing games on electronic gaming devices 112, 114, and/or 116 may only play against each other and not against individuals playing games on electronic gaming devices located at authorized gaming establishments 108 and 110.

In another embodiment, individuals from one authorized gaming establishment may play games against individuals in other authorized gaming establishments via server 154 and communication channels 162, 164, and 166. Server 154 performs a variety of tasks necessary for game play between and among individuals at different electronic gaming devices located at different authorized gaming establishments. For example, server 154 may allow an individual to play live Texas Hold 'Em poker at electronic gaming device 116 against individuals at electronic gaming devices 118, 122, 124, and 132, respectively.

In yet another embodiment, individuals from one authorized gaming establishment may play games against individuals located remotely from any authorized gaming establishment, via server 154 connected to a wide area network, shown in FIG. 1 as Internet 140. In this embodiment, an individual may use a personal computing device 142, 144, and/or 146 (e.g., a home computer, tablet device, smartphone, etc.) connected to Internet 140 to play games of chance and/or skill with individuals located at electronic gaming devices inside authorized gaming establishment 106, 108, and/or 110. Server 154 performs a variety of tasks necessary for game play between and among individuals at different the various electronic gaming devices and personal computing devices.

Figure 2:
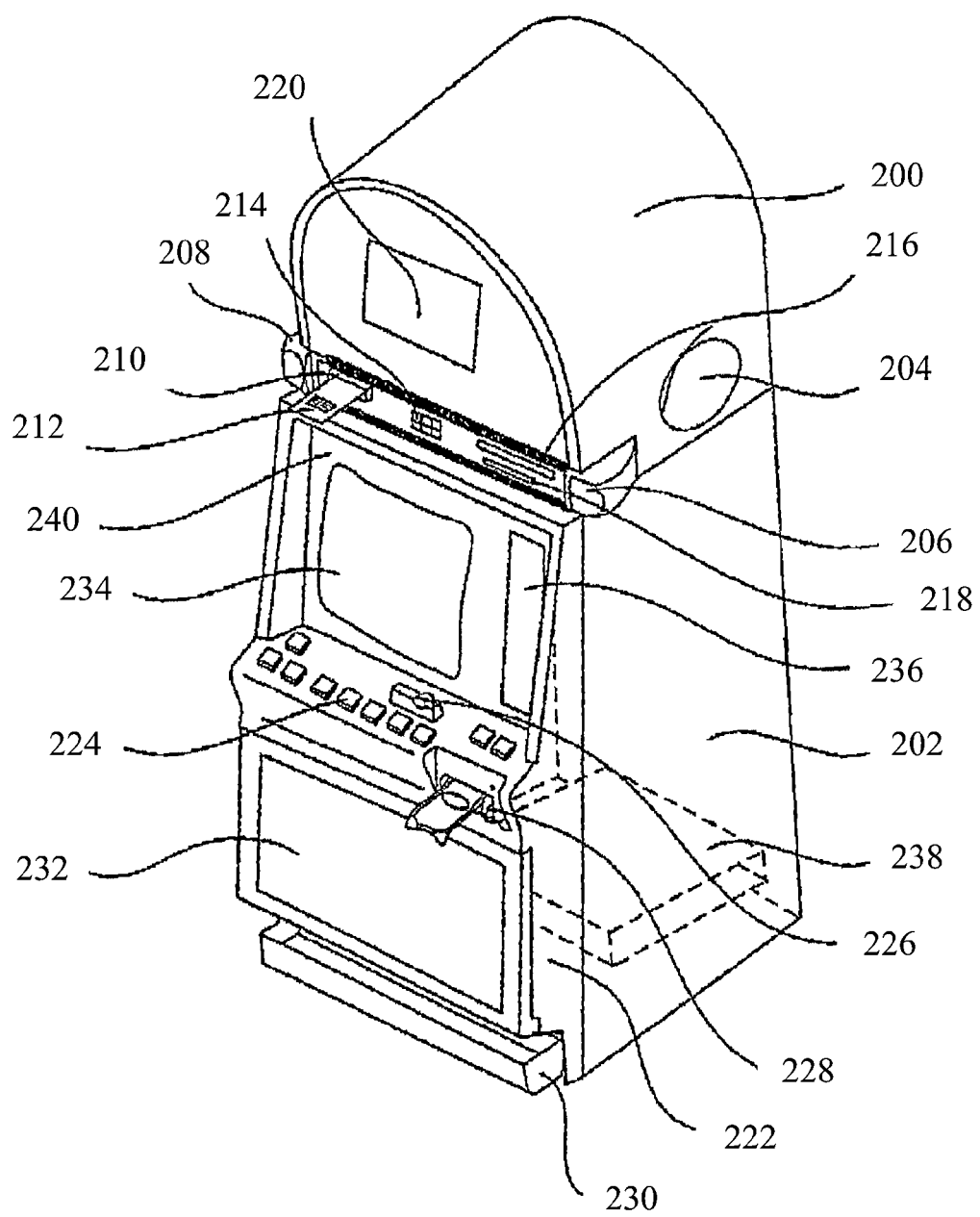
FIG. 2 shows a perspective view of one embodiment of one of the electronic gaming devices shown in FIG. 1.

FIG. 2 shows a perspective view of one embodiment of one of the electronic gaming devices shown in FIG. 1, in this example electronic gaming device 116, otherwise known as a slot machine, slot device, user terminal, player terminal, video slot machine, or other nomenclature. It should be understood that although electronic gaming device 116 is shown in FIG. 2 as a slot machine, this is not meant to be a limiting configuration. In other words, electronic gaming device 116 may, alternatively, take the form of a fixed or mobile computer, tablet, "table-top" gaming device, smartphone, or virtually any other electronic device capable of networking with server 154. In the case of a mobile device, it would be desirable if a location of the device could be ascertained, at a single point in time or periodically as games are being played, so that the device may be associated with a particular authorized gaming establishment. For example, a player may wish to use the player's iPad, manufactured by Apple Incorporated of Cupertino, Calif., to participate in live game play using the system shown in FIG. 1. In this case, the player may be required to access network 156 and/or 162 via a Wi-Fi connection to a wireless router operated by authorized gaming establishment 106. In another embodiment, a location of the player's mobile device could be ascertained using one or more available positioning technology, such as GPS or mulitlateration, and the position provided to server 154 so that an association between that device and authorized gaming establishment 106 may be established.

Referring now back to FIG. 2, in this embodiment, electronic gaming device 116 comprises a device meeting the standards set by the Regulations of the Nevada Gaming Commission in, for example, "Technical Standards for Gaming Devices and On-Line Slot Systems". Such standards regulate odds, payoff amounts, currency exchange, random number generation, and technical specifications relating to fraud detection and prevention. It may be advantageous to allow live game play via such player terminals because they are manufactured within the aforementioned standards and, thus, retain a degree of similarity between different games and devices. For example, electronic gaming devices manufactured to such standards typically comprise large, lit buttons for players to easily interact with the device.

As illustrated in the example of FIG. 2, electronic gaming device 116 includes a main cabinet 202, which generally surrounds the electronic gaming device interior and is viewable by players. The main cabinet may include a main door 222 on the front of the machine, which opens to provide access to the interior of electronic gaming device 116. Attached to the main door are player-input switches or buttons 224, a coin acceptor 226, and a bill validator 228, a coin tray 230, and a belly glass 232. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, a game denomination (e.g. $0.25 or $1). The bill validator 228, player-input switches 224, video display monitor 34, and information panel are devices used to play a game on the electronic gaming device 116.

According to a specific embodiment, electronic gaming device 116 may be controlled by processor-executable code executed by a processor located on or in master gaming controller 238 housed inside the main cabinet 202 of electronic gaming device 116. The hardware and software associated with the master gaming controller 238 may be distributed throughout the cabinet 202 and is not limited to the specific location illustrated in the FIG. 2.

Many different types of games, including mechanical slot games, video slot games, video poker, video black jack, video pachinko and lottery, may be provided with gaming machines of this invention. In particular, electronic gaming device 116 may be operable to provide a play of many different instances of games of chance and/or skill. The instances may be differentiated according to themes, sounds, graphics, type of game (e.g., slot game vs. card game), denomination, number of paylines, maximum jackpot, progressive or non-progressive, bonus games, etc. The electronic gaming device 116 may be operable to allow a player to select a game to play from a plurality of instances available on the gaming machine. For example, the gaming machine may provide a menu with a list of the instances of games that are available for play on electronic gaming device 116 and a player may be able to select from the list a first instance of a game that they wish to play.

The various instances of games available for play on electronic gaming device 116 may be stored as game software on a mass storage device in electronic gaming device 116 or may be generated by, or hosted by, server 134, 136, 138, and/or server 154 and displayed on electronic gaming device 116. The electronic gaming device 116 may executed game software, such as but not limited to video streaming software that allows the game to be displayed on electronic gaming device 116. When game software is stored on electronic gaming device 116, it may be loaded from the mass storage device into an electronic memory, e.g. RAM, for execution by the processor. In some cases, after a selection of a particular game, the game software related to the game may be downloaded from one of the servers 134, 136, 138, and/or server 154, or it may be even downloaded from another player interface.

As illustrated in the example of FIG. 2, electronic gaming device 116 includes a top box 200, which sits on top of the main cabinet 202. The top box 200 houses a number of devices, which may be used to add features to a game being played on electronic gaming device 116, including speakers 204, 206, 208, a ticket printer 210 which prints bar-coded tickets 212, a key pad 214 for entering player tracking information, a florescent display 216 for displaying player tracking information, a card reader 218 for entering a magnetic striped card containing player tracking information, and a video display screen 220. The ticket printer 210 may be used to print tickets for a cashless ticketing system. Further, the top box 200 may house different or additional devices not illustrated in FIG. 2. For example, the top box may include a bonus wheel or a back-lit silk screened panel, which may be used to add bonus features to the game being played on electronic gaming device 116. As another example, the top box may include a display for a progressive jackpot offered on the gaming machine. During a game, these devices are controlled and powered, in part, by circuitry (e.g. a master gaming controller) housed within the main cabinet 202 of the electronic gaming device 116.

In one embodiment, electronic gaming device 116 provides an indication of a status of live-play games. For example, video display screen 220 may display an image indicating which games have an opening for a player to participate and/or a subset of games having an open position. In another embodiment, video display screen 220 may display an image indicating that a new table has opened for game play. For instance, in a networked gaming system comprising gaming device 116 belongs and 100 other electronic gaming devices in communication with server 134, server 134 may, in this example, offer 4 types of games available for live-play: $2/4 Texas Hold 'Em, $3/$6 Texas Hold 'Em, Blackjack with a $25 minimum bet, and Blackjack with a $50 minimum bet. Each of the two Texas Hold 'Em virtual tables may accommodate 10 players, while each of the Blackjack virtual tables may accommodate 7 players playing against a house entity. If all of the available positions for all four virtual tables are "occupied" by players, video display screen 220 may display a message indicating so. However, if one of the players participating in the $3/$6 Hold 'Em virtual table terminates game play, video display screen 220 may display a message, icon, or other visual indication that a "seat" has become available on the $3/$6 virtual Texas Hold 'Em table. Similarly, if one of the players participating in the $50 Blackjack table terminates game play, video display screen may display a message, icon, or other visual indication that a "seat" has become available on the $50 Blackjack table. In any case, information pertaining to available positions on any of the games offered by electronic gaming device 116 and/or server 134 and/or server 154 is generally determined by either server 134 and/or server 154, as the case may be, and provided to electronic gaming device 116 via communication medium 156 and/or communication medium 162.

In another embodiment, an audible indication of live-play status may be provided by one or more speakers 204, 206, and/or 208. For example, if a seat has become available at the $25 Blackjack table described above, speaker 206 may announce, audibly, that a seat has become available at that particular table. In other embodiment, if server 134 forms a new $10/$20 Texas Hold 'Em table, speaker 208 may announce that such a table has just formed, and that 10 players are needed to begin game play. As players join this new table, speakers 204, 206, and/or 208 may update the remaining number of players needed to begin game play. In this embodiment, server 134 generally determines the availability of seats at the various games offered by server 134 and/or server 154 and provides this information to electronic gaming device 116.

In one embodiment, each electronic gaming device provides the live-play status at different times from one another. This avoids a number of electronic gaming devices located near one another from, for example, providing overlapping audible live-play status, potentially creating confusion to potential players or audibly "drowning" one announcement over others. Each electronic gaming device may delay providing live-play status by incorporating a random delay before providing the indication. In another embodiment, server 134 and/or server 154 provides live-play status at predetermined time intervals designed to avoid interference among nearby-situated electronic gaming machines. In this embodiment, server 134 and/or server 156 uses the location information of electronic gaming machines to determine when to send live-play status updates to the electronic gaming machines. For example, server 134 and/or server 156 will generally stagger updates to adjacent electronic gaming machines to avoid audible interference of live-play status.

In another embodiment, both a visual indication and an audible indication of live-play game status may be provided by electronic gaming device 116.

It will be appreciated that electronic gaming device 116 is but one example from a wide range of gaming machine designs on which the embodiments discussed herein may be implemented. For example, not all suitable gaming machines have top boxes or player tracking features. Further, some gaming machines have only a single game display—mechanical or video, while others are designed for bar tables and have displays that face upwards. As another example, a game may be generated by, and executed on, a one or more servers 134, 136, 138, and/or server 154 and may be displayed on electronic gaming device 116.

Some player interfaces shown in FIG. 1 are implemented with special features and/or additional circuitry that differentiates them from general-purpose computers (e.g., desktop PC's and laptops). Electronic gaming devices are highly regulated to ensure fairness and, in many cases, electronic gaming devices are operable to dispense monetary awards of multiple millions of dollars. Therefore, to satisfy security and regulatory requirements in a gaming environment, hardware and software architectures may be implemented in electronic gaming devices that differ significantly from those of general-purpose computers.

Figure 3:
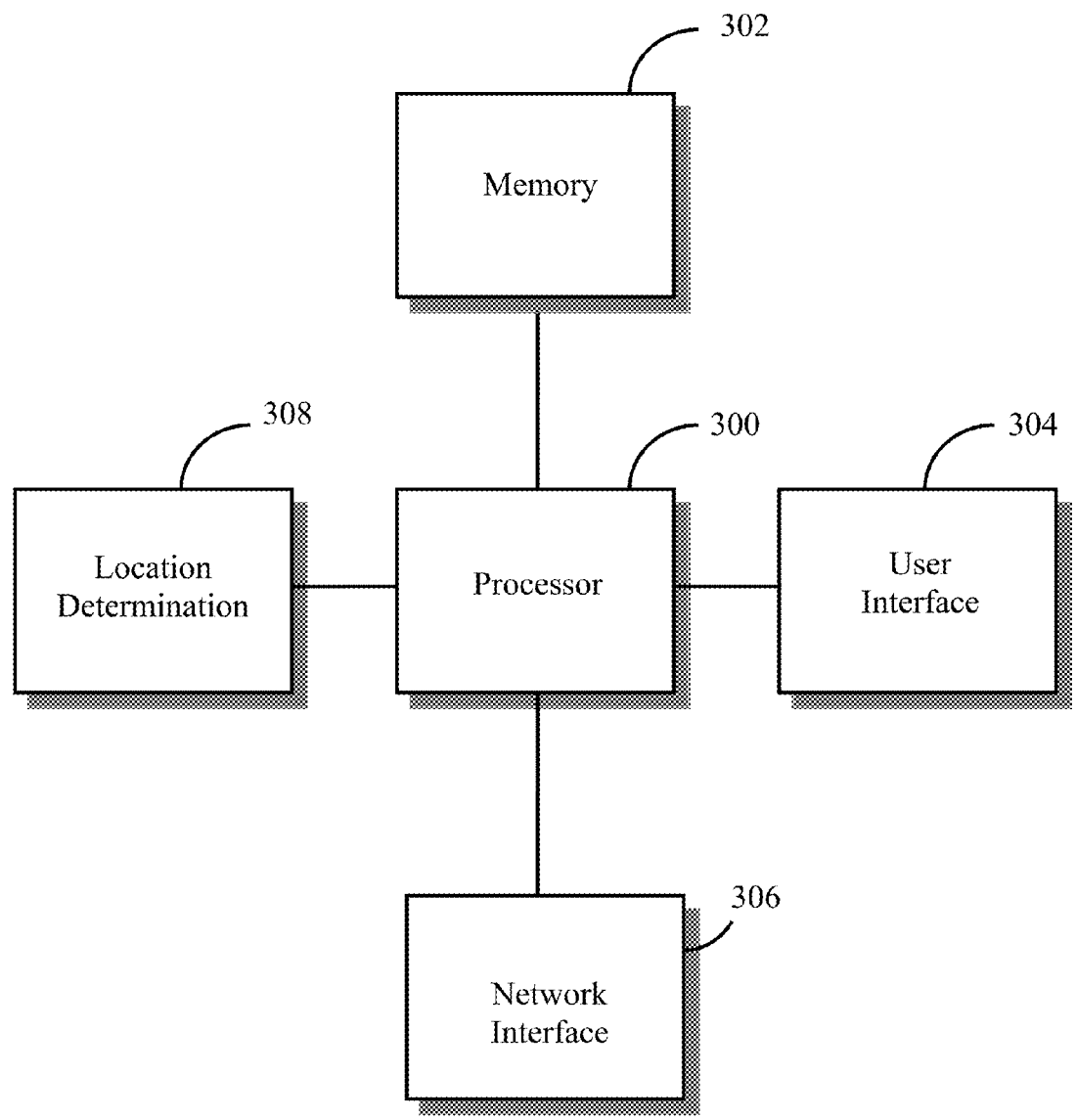
FIG. 3 is a functional block diagram of one embodiment of the electronic gaming device shown in FIG. 2.

FIG. 3 is a functional block diagram of one embodiment of the electronic gaming device shown in FIG. 2, for example, electronic gaming device 116. Shown are processor 300, memory 302, player interface 304, network interface 306, and location device 308. It should be understood that in some embodiments, not all of the functional blocks shown in FIG. 3 are necessary for the proper operation of electronic gaming devices and that some functionality has been omitted for purposes of clarity.

Player interface 304 generally comprises hardware and/or software necessary for allowing a player of electronic gaming device 300 to play games of chance and/or skill either against other players at different electronic gaming devices, against "the house" or non-human player such as electronic gaming device 300, server 134 and/or server 154. Player interface 304, as described above in the description relating to FIG. 2, may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-232 port, a USB port, a network port, a card reader, and/or virtually any other device that allows a player of the electronic gaming device to communicate, or interact, with the electronic gaming device. A player of electronic gaming device 300 uses player interface 304 to enter player selections and receive information pertaining to a game that the player has selected. Information may include graphic representation of cards, dice, Bingo balls, or other objects of gaming, the status of a game in progress, previous game results, odds for a particular event occurring, a player account balance, a number of "reward points" earned by the player, still or video images of other players, audio from other players or a dealer, and any other information pertaining to game play.

Processor 300 comprises a general-purpose microprocessor well known in the art or it may comprise a custom or semi-custom ASIC able to carry out the functionality required for allowing a player of electronic gaming device 116 to play games. Processor 300 generally executes processor-readable, or processor-executable, instructions stored in one or more mediums, such as memory 302, that control most or all of the functionality of electronic gaming device 116. Examples of memory 302 comprise one or more electronic memories such as RAM, ROM, hard drives, flash memory, EEPROMs, UVPROMs, etc. Network interface 306 comprises hardware and/or software configured to send and receive electronic communications between electronic gaming device 116 and other networked devices, such as any of the electronic gaming devices, servers, and/or personal computing devices shown in FIG. 1. Network interface may comprise circuitry necessary to process the electronic communications and may be designed specifically to communicate in a predetermined communication protocol, such as TCP/IP, RS-232, or other well-known form of digital communication protocols. Each of electronic gaming device, server, and/or personal computing device may be interconnected with each other by one or more communication networks, such as the Internet, a fiber optic network, a radio network, a wired or wireless telephone network, a satellite network, a wired or wireless data network, and/or any other well-known, two-way communication network.

Location device 308 provides information pertaining to the physical location of electronic gaming device 116. It may comprise hardware and/or software necessary to determine a location of electronic gaming device 116. For example, location device 308 may comprise a commercially-available GPS chip plus supporting circuitry. Such a device is well-known in the art and typically provides location accuracy to several meters. Other position-determination devices could be used in the alternative, such as circuitry used to perform multilateration, which uses the difference in distance to two or more fixed stations at known locations that broadcast a reference signal at known times. In another embodiment, the location of electronic gaming device 116 may be determined by human intervention without the need for location device 308. For example, a technician may determine GPS coordinates related to electronic gaming device 116 using a handheld GPS device and enter that information into electronic gaming device 116 via player interface 304, where it would be provided to memory 302 for storage. Processor 300 may then provide the location information to another electronic gaming device or server, either autonomously or upon request by another electronic gaming device or server. In another embodiment, the GPS coordinates determined by the technician could be provided directly to one or more other electronic gaming devices and/or be provided directly to one or more of the servers shown in FIG. 1.

Figure 9:
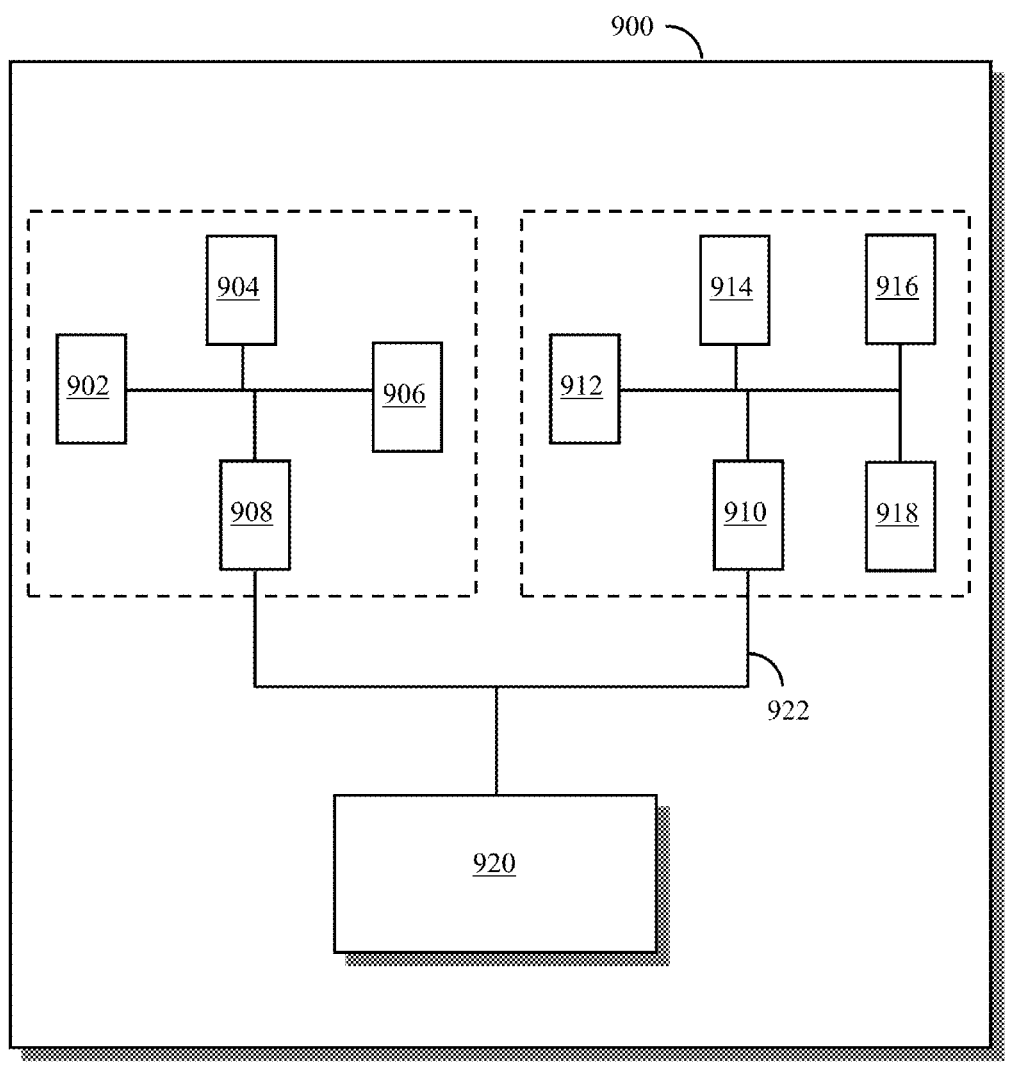
FIG. 9 illustrates one embodiment of a networked gaming system comprising a central server, a first local network, and a second local network.

In yet another embodiment, a pre-assigned identification code or address could be used to determine the location of electronic gaming device 116. For example, as shown in FIG. 9, authorized gaming establishment 900 comprises a central server 920 networked to local servers 908 and 910 via communication medium 922. Electronic gaming devices 902, 904, and 906 are, in turn, networked to server 908, forming a first local network. Each device in the first network comprises an IP address beginning with, in this example, 192.168.1.X. For instance, server 908 could be assigned an IP address of 192.168.1.1, while electronic gaming device 902 could be assigned an IP address of 192.168.1.2 and electronic gaming device 904 assigned an IP address of 192.168.1.3. In addition, each electronic gaming device typically comprises a pre-assigned hardware code, commonly referred to as a MAC address. The MAC address may be associated with the assigned IP address for each of the electronic gaming devices in the first network.

Electronic gaming devices 900, 902, and 904 may be physically located in a first geographic portion of authorized gaming establishment 900, such as "on the third floor", "in the east wing", near the buffet, or other common physical attribute.

Authorized gaming establishment 900 may additionally comprise a second local network, comprising server 910 and electronic gaming devices 912, 914, 916, and 918. Each of these devices in the second network comprises an IP address beginning with, in this example, 192.168.0.X. For instance, server 910 could be assigned an IP address of 192.168.0.1, while electronic gaming device 912 could be assigned an IP address of 192.168.0.2 and electronic gaming device 914 assigned an IP address of 192.168.0.3. In addition, each electronic gaming device typically comprises a pre-assigned hardware code, commonly referred to as a MAC address. The MAC address may be associated with the assigned IP address for each of the electronic gaming devices in the second network. Electronic gaming devices 912, 914, 916, and 918 may be physically located in a second geographic portion of authorized gaming establishment 900, the second geographic portion typically located a predetermined distance away from the first geographic portion to ensure that a player using one of the electronic gaming devices in the first local network cannot view action occurring on an electronic gaming device in the second local network.

Thus, simply by knowing the local IP address and/or MAC address of an electronic gaming device, central server 920 or another server, such as server 154, may determine a "course" location of each of the electronic gaming devices by knowing that each electronic gaming device in the first network is located in the first geographic area of authorized gaming establishment 900, while each electronic gaming device in the second network is located in the second geographic area of authorized gaming establishment 900.

Figure 4:
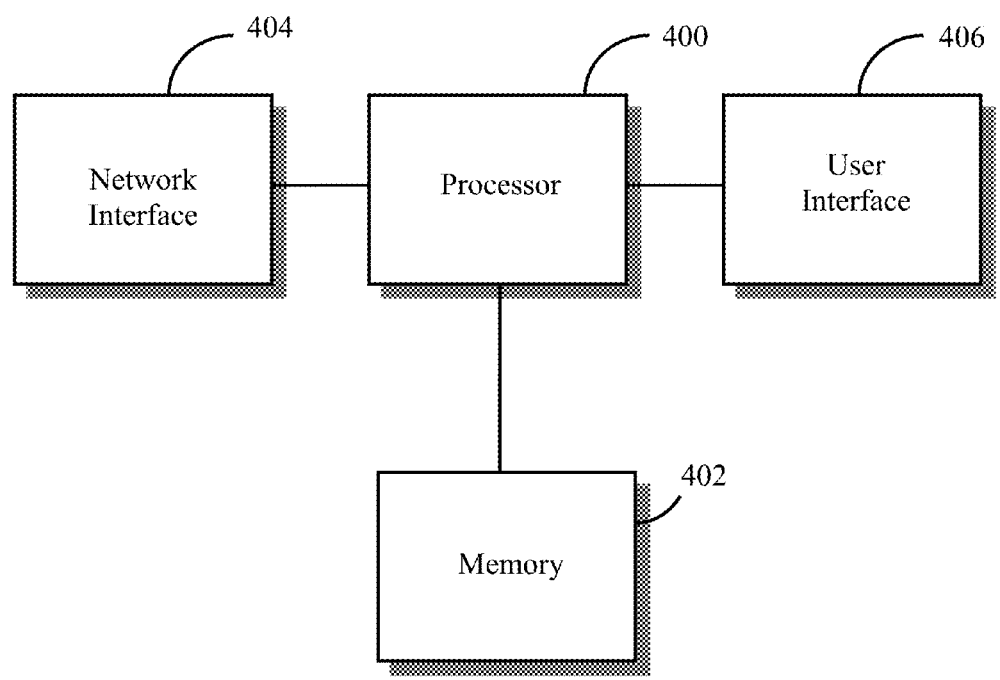
FIG. 4 illustrates a functional block diagram of one embodiment of one of the servers shown in FIG. 1.

FIG. 4 illustrates a functional block diagram of one embodiment of server 134, 136, and/or 138 shown in FIG. 1. These servers each comprise a processor 400, a memory 402, a network interface 404, and a player interface 406. The sever may comprise a computer, application server, web server, or other electronic device that provides functionality for game play between and among players of the electronic gaming devices and/or personal computing devices shown in FIG. 1, including generating a virtual playing environment typically comprising a virtual gaming table, play management, wagering management, etc. For example, the servers may each provide an electronic version of poker, blackjack, craps, roulette, and/or other game of chance and/or skill to remote players using electronic gaming devices operated by the players. The games are typically processed within each server, i.e., random number generation used to provide game values to players (such as card values, dice values, etc.), providing the game values to players, win determination, wager management, etc.

Processor 400 comprises a general-purpose microprocessor well known in the art or it may comprise a custom or semi-custom ASIC able to carry out the functionality required for game play. Processor 400 generally executes processor-executable instructions stored in one or more mediums, such as memory 402, that control most or all of the functionality of the server. Examples of memory 402 include one or more electronic memories such as RAM, ROM, hard drives, flash memory, EEPROMs, UVPROMs, etc. Network interface 404 comprises hardware and/or software configured to receive and process electronic communications from electronic gaming devices and personal computing devices connected to one or more communication networks, such as the Internet, a fiber optic network, a radio network, a wired or wireless telephone network, a satellite network, a wired or wireless data network, and/or any other well-known, two-way communication networks.

User interface 406 generally comprises hardware and/or software necessary for allowing a user of the server, such as an authorized technician or operator, to perform various duties related to the maintenance and upkeep of the server. Such duties may include entering information pertinent to the location of various electronic gaming devices distributed within an authorized gaming establishment, updating software, performing trouble-shooting activities, accessing past game-play data, accessing player accounts, and so on. Player interface 406 may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-232 port, a USB port, a card reader, a network port, and/or virtually any other device that allows a player of the server to communicate with the server.

Figure 5:
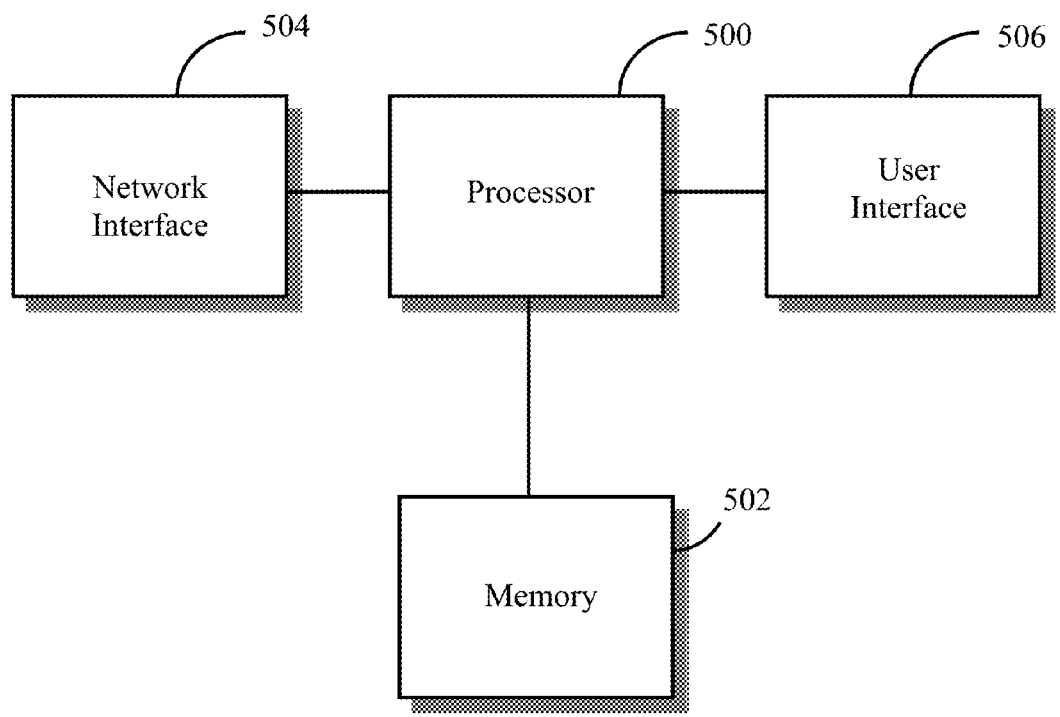
FIG. 5 illustrates a functional block diagram of one embodiment of server 154 shown in FIG. 1.

FIG. 5 illustrates a functional block diagram of one embodiment of the server 154 shown in FIG. 1. Server 154 allows players located in different authorized gaming establishments to play games of chance and/or skill against and/or with one another and/or against a house entity in real-time or near real-time, each using a respective one of the electronic gaming devices shown in FIG. 1.

Server 154 comprises a processor 500, a memory 502, a network interface 504, and a player interface 506. Server 154 may comprise a computer, application server, web server, or other electronic computing device that provides functionality for game play between and among players of the electronic gaming devices and/or personal computing devices shown in FIG. 1, including generating a virtual playing environment typically comprising a virtual gaming table, play management, wagering management, etc. Processor 500 comprises a general-purpose microprocessor well known in the art or it may comprise a custom or semi-custom ASIC able to carry out the functionality required for game play. Processor 500 generally executes processor-executable instructions stored in one or more mediums, such as memory 502, that control most or all of the functionality of server 154. Examples of memory 502 include one or more electronic memories such as RAM, ROM, hard drives, flash memory, EEPROMs, UVPROMs, etc. Network interface 504 comprises hardware and/or software configured to receive and process electronic communications from electronic gaming devices and personal computing devices connected to one or more communication networks, such as the Internet, a fiber optic network, a radio network, a wired or wireless telephone network, a satellite network, a wired or wireless data network, and/or any other well-known, two-way communication networks.

User interface 506 generally comprises hardware and/or software necessary for allowing a user of server 154, such as an authorized technician or operator, to perform various duties related to the maintenance and upkeep of server 154. Such duties may include entering information pertinent to the location of various electronic gaming devices distributed within an authorized gaming establishment, updating software, performing trouble-shooting activities, accessing past game-play data, accessing player accounts, and so on. User interface 506 may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-232 port, a USB port, a card reader, a network port, and/or virtually any other device that allows a player of server 154 to communicate with server 154.

Figure 6:
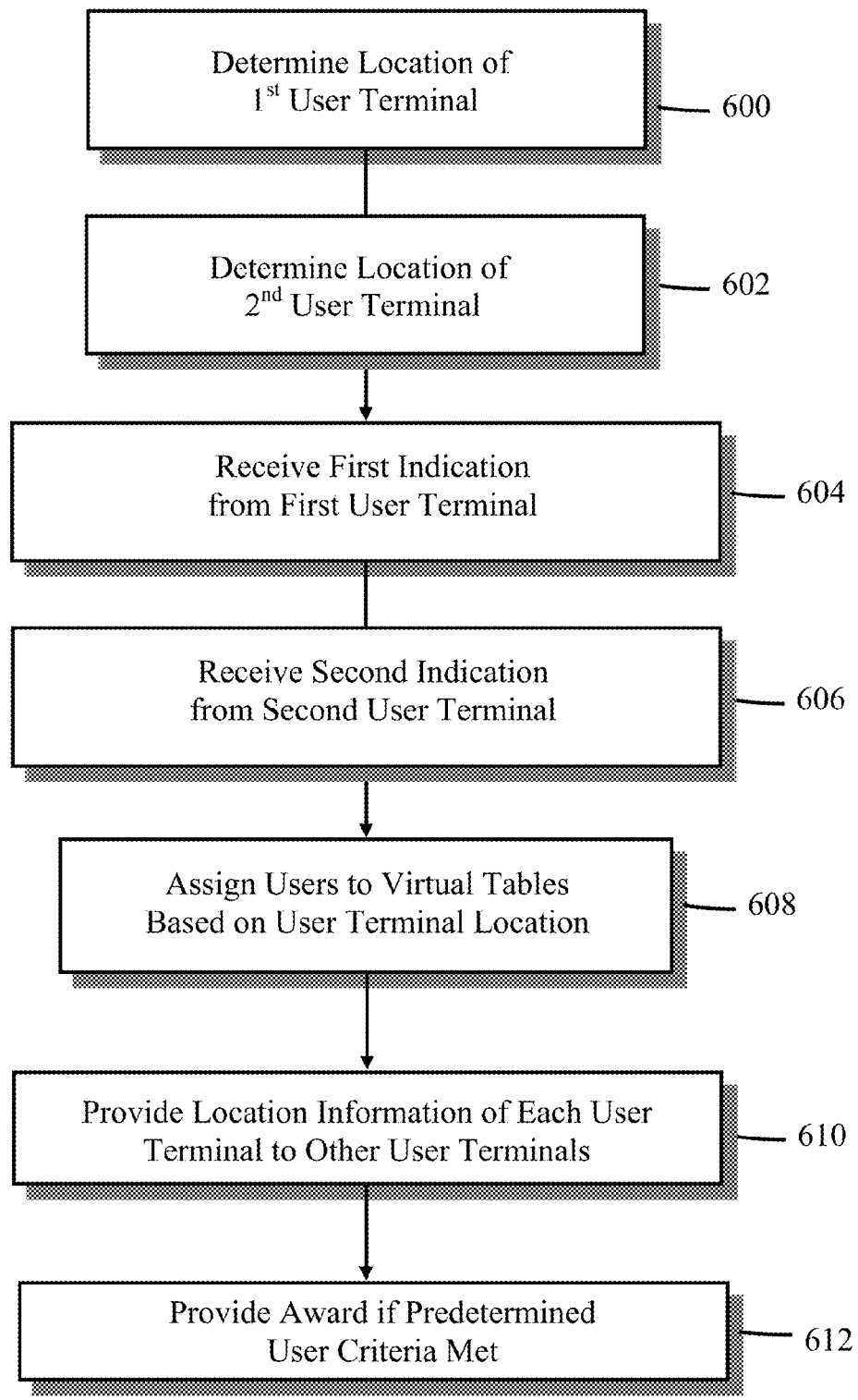
FIG. 6 is a flow diagram illustrating one embodiment of a method for providing network-based gaming within an authorized gaming establishment.

FIG. 6 is a flow diagram illustrating one embodiment of a method for providing live-play network-based gaming within an authorized gaming establishment. The method is implemented by a processor, such as processor 400 shown in FIG. 4, located in server 134, 136, and/or 138, executing processor-readable instructions stored in a memory, such as memory 402 shown in FIG. 4. The server is electronically coupled to a plurality of electronic gaming devices, such as the ones shown in FIG. 1. It should be understood that in some embodiments, not all of the steps shown in FIG. 6 are performed and that the order in which the steps are carried out may be different in other embodiments. It should be further understood that some minor method steps have been omitted for purposes of simplicity.

At block 600, the server determines a location of a first electronic gaming device. The determination may be performed once, for example during an initialization of the server, and/or it may be performed at other times, such as at periodic time intervals or upon the occurrence of a predefined event, such as receipt of an indication from a player of the first electronic gaming device of a desire to play a particular game offered by the server.

The location may be expressed as a GPS coordinate, a description of the location (for example, $1^{st}$ floor, $2^{nd}$ floor, $3^{rd}$ floor, near $1^{st}$ elevator bank, near \$5 slot machines, near exit #12, near front entrance, near rear entrance, $3^{rd}$ position in a "bank" of 6 electronic gaming devices, gaming area 4, etc.), X/Y mapping coordinates, polar coordinates, or virtually any other expression of a location. In one embodiment, the location of the first electronic gaming device may be determined by a position-determining device located within the first electronic gaming device, such as a GPS device. In another embodiment, the location of the first electronic gaming device may be determined by a portable GPS device carried by a technician employed by the authorized gaming establishment. In this embodiment, the technician may approach the first electronic gaming device and determine its position by observing an indication displayed by the technician's GPS device. The technician may then provide this information to the server by any number of ways, including electronically uploading the information to the server or entering the information using user interface 406, as described above. In another embodiment, a location of the first electronic gaming device may be provided to the server based on other information, such as a schematic diagram or blueprint of a layout of the authorized gaming establishment.

In many cases, the location of the first electronic gaming device in an authorized gaming establishment is determined manually, i.e., by measuring the distance of each electronic gaming device to certain stationary objects, such as walls, doorways, windows, etc. This information is typically entered into a software program used to simulate the physical layout of an authorized gaming establishment. Such software may be used, for example, in conjunction with a video monitoring system, jackpot payout alert, security system, player's reward card system, and/or other system where electronic gaming device layout and/or location may be useful. As such, the location information of the first electronic gaming device may be provided to the server electronically from the software program that stores the location information.

In other embodiments, the location of the first electronic gaming device is determined using an IP address or MAC address, previously described herein.

At block 602, the server may determine a location of a second electronic gaming device in any one or more of the ways described above with respect to determining the location of the first electronic gaming device. The server may determine the location of other electronic gaming devices distributed within the authorized gaming establishment as well.

At block 604, the server receives an indication from the first electronic gaming device that a player of the first electronic gaming device wishes to participate in a game offered by the server. The indication is typically an electrical signal in analog or digital format, sent by the first electronic gaming device in response to a first player of the first electronic gaming device interacting with the first electronic gaming device.

For example, the first player may sit in front of the first electronic gaming device and press a button or touch a touch-screen associated with a player interface, such as player interface 304. The act of pressing the button or touchscreen is associated with initiating participation in a game offered by the first electronic gaming device, the server, or both. In one embodiment, the first player may press a button or the touch-screen associated with a game selection, such as jacks-or-better poker, Texas Hold 'Em, stud poker, roulette, bingo, keno, craps, or other games of chance and/or skill. In response to the first player pressing the selected button or touchscreen position, a processor within the first electronic gaming device, such as processor 300 of FIG. 3, generates an indication of the first player's desire to initiate game play of the particular selected game type. The indication may comprise an analog or digital electronic signal sent wirelessly or via electrically-conductive wire(s), or it may comprise a signal compatible with some other communication medium, such as fiber-optic cable, or any other medium.

In another embodiment, the indication described above may additionally comprise a further selection by the first player to further define his or her game selection. For example, the first player may use the player interface to select a game of Texas Hold 'Em, then select a particular set of betting limits, or stakes, related to a game of Texas Hold 'Em. For example, the first player may be provided a choice of betting limits of \$1/\$2, \$3/\$6, \$5/\$10, and \$10/\$20 betting limits, the first dollar amount in each pair representing a minimum and maximum bet per player turn during the first two rounds of play and the second dollar amount in each pair representing a minimum and maximum bet per player turn during the final two rounds of play. Other possible further selections by the first player, in addition to the stakes discussed above, comprise a maximum number of players at a virtual table, a minimum number of players at a virtual table, a location of other players, an identification of another player that is familiar to the first player, such as a friend or relative, and/or other selections.

At block 606, the server receives an indication from the second electronic gaming device that a player of the second electronic gaming device wishes to participate in the same game and/or other criteria as was selected by the first player at block 604. For example, if the first player selected a game of draw poker having stakes of $5 initial wagering and $10 for other rounds of wagering, the player operating the second electronic gaming device also selects draw poker having stakes of $5 initial wagering and $10 for other rounds of wagering.

At block 608, after receiving the first and second indications from the first and second electronic gaming devices, respectively, the server assigns the first player and the second player to either the same virtual game table or to different virtual tables associated with the selected game and/or other criteria, based on the relative locations of the electronic gaming devices. The technical details of assigning players to virtual tables by servers is well known in the art.

In one embodiment, the first player and the second player are assigned to different tables if the first electronic gaming device is within a predetermined distance from the second electronic gaming device. This is to prevent collusion between the first player and the second player. If electronic gaming devices are located too close to one another, the first player and/or the second player could shuttle between terminals to view each other's virtual cards and gain an advantage over other players. In one embodiment, the predetermined distance is a minimum distance to ensure that one player cannot shuttle between another electronic gaming device playing at the same virtual table within a given time limit for each player to act as his or her turn comes due during game play.

For example, if the first electronic gaming device and the second electronic gaming device were both located on the second floor of a casino, spaced apart from one another by only 10 feet, a player of the first electronic gaming device could walk over to the second electronic gaming device and view the virtual cards assigned to the player of the second electronic gaming device, either with or without the knowledge and/or consent of the second player. Then, the first player could return to the first electronic gaming device and use the knowledge of the second player's virtual cards to gain an advantage over other players at the same virtual table. However, if the first and second electronic gaming devices were separated from one another by, for example, 100 feet, it would be difficult for the first player to go over to the second electronic gaming device, view the second player's virtual cards, and return to the first electronic gaming device in time to avoid a time-out associated with a maximum time period in which to act during game play. Thus, a predetermined distance may be selected on the basis of the distance between electronic gaming devices, determined from each electronic gaming device location, as determined in blocks 600 and 602.

In another example, a factor other than the distance between electronic gaming devices may be used to determine whether the first and second players may be assigned to the same virtual table. For example, if the first electronic gaming device is located on one floor of a multi-story casino and the second electronic gaming device is located on a different floor than the first electronic gaming device, the server may use this information as the basis for assigning two players to the same virtual table or not. For example, if the first and second electronic gaming devices are located on the same floor, then the server may not assign players of the first and second terminals, respectively, to the same virtual table. However, if the first and second electronic gaming devices are, in fact, located on different floors, the server may assign players of the first and second terminals, respectively, to the same virtual table.

In another embodiment, server 154 may use the IP address and/or MAC address of electronic gaming devices to determine whether to assign players to the same virtual table. For example, server 154 may assign two players to the same virtual table only if their respective electronic gaming devices comprise IP addresses belonging to different sub-networks.

In other embodiments, a combination of location criteria may be used to determine whether the first and second players may be assigned to the same virtual table. For example, if the first electronic gaming device is located on a first floor of a casino and the second electronic gaming device is located on a second floor of the same casino, but both electronic gaming devices are near the same staircase, both the distance and the floor location of the first and second electronic gaming devices may be used to determine player table assignment. Thus, the server may not assign the first player and the second player to the same virtual table, even though they on different floors, if the distance between the first and second electronic gaming devices is within a predetermined distance. Said another way, the server may only assign the first and second players to the same virtual table if they are a) located on different floors and b) spaced apart from one another by a predetermined distance one would have to travel to get from the first electronic gaming device to the second electronic gaming device. Of course, other combinations of criteria could be used in the alternative.

At block 610, after players have been assigned to a virtual game table, the server may reveal the location of each player playing at the assigned virtual game table to the other players at the same table. This may be accomplished by transmitting visual information, such as a map and/or textual information, regarding the location of each electronic gaming device to each of the players at the virtual game table.

At block 612, play begins, and the slot club card server begins tracking player activities related to game play. If a predetermined criterion is met, such as a number of hands played, a number of jackpots or tournaments won, a number of all-in bets made, a number of losing hands played, a number of losing hands in a row, and/or other criteria, an award may be given to any player who meets the criterion. Game play continues typically until the end of a round of play, where one or more winners are determined and wagers are settled in accordance with principles well-known in the art.

Figure 7:
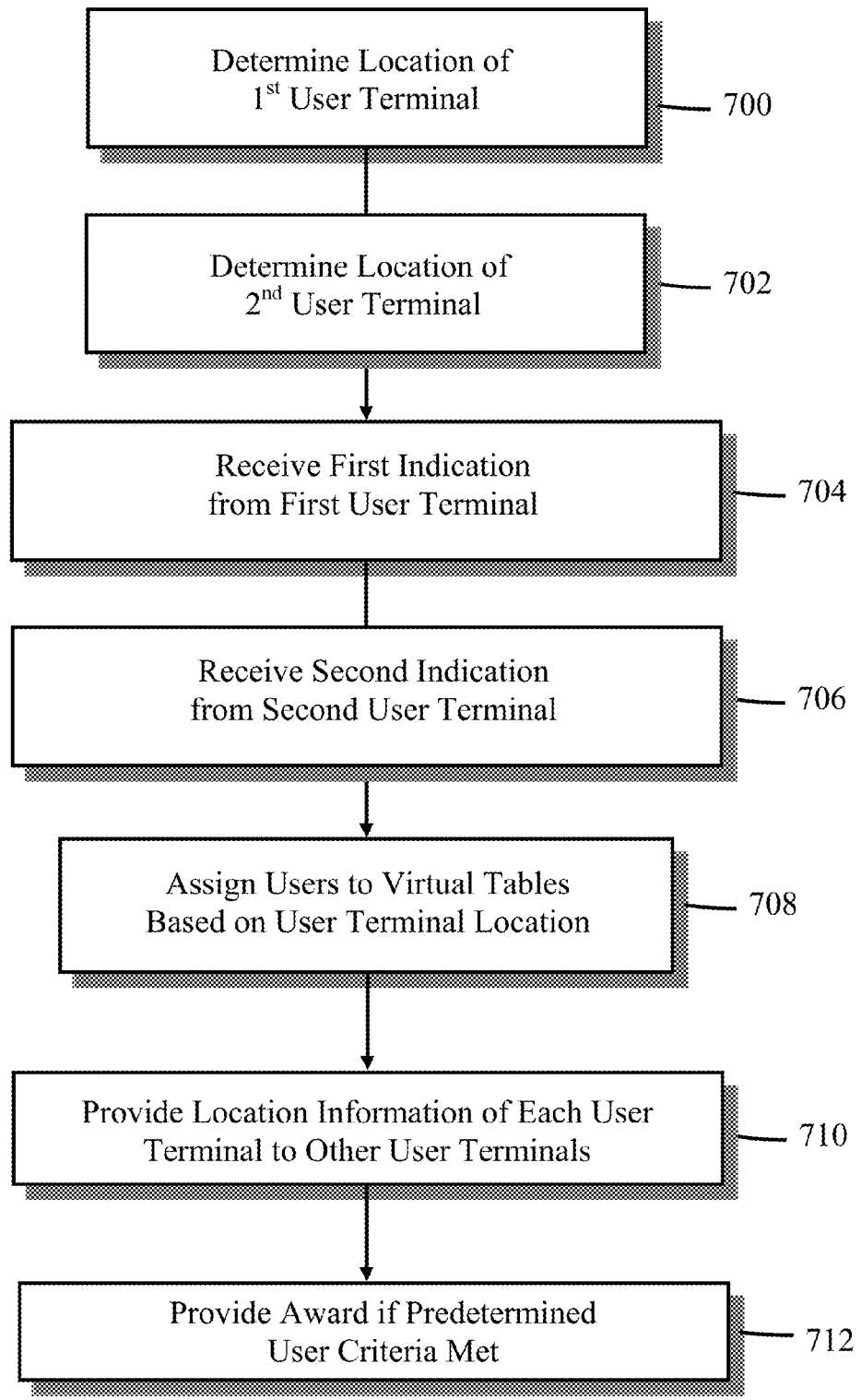
FIG. 7 is a flow diagram illustrating one embodiment of a method for providing network-based gaming between/among players located at two or more authorized gaming establishments.

FIG. 7 is a flow diagram illustrating one embodiment of a method for providing live-play, network-based gaming between/among players located at two or more authorized gaming establishments, such as two or more players operating respective electronic gaming devices located in different casinos. The method is implemented by a processor, such as processor 500 shown in FIG. 5, located in server 154, as shown in FIG. 1, executing processor-readable instructions stored in a memory, such as memory 502 shown in FIG. 5. The server is typically electronically coupled to a plurality of electronic gaming devices distributed between/among two or more authorized gaming establishments, such as the ones shown in FIG. 1 located in, in this embodiment, authorized gaming establishments 106, 108, and 110. Server 154 may be located in any one of the authorized gaming establishments, or it could be placed at some other location, such as a third party management company, web hosting company, etc.

In one embodiment, server 154 is electronically coupled to electronic gaming devices via intermediate servers, such as servers 134, 136, and/or 138. In another embodiment, server 154 is electronically coupled directly to the electronic gaming devices. In yet another embodiment, some electronic gaming devices are electronically coupled directly to server 154, while other electronic gaming devices are routed through an intermediate server.

It should be understood that in some embodiments, not all of the steps shown in FIG. 7 are performed and that the order in which the steps are carried out may be different in other embodiments. It should be further understood that some minor method steps have been omitted for purposes of clarity.

At block 700, server 154 determines a location of a first electronic gaming device. The determination may be performed once, for example during an initialization of server 154, and/or it may be performed at other times, such as at periodic time intervals or upon the occurrence of a predefined event, such as receipt of an indication from a player of the first electronic gaming device of a desire to play a particular game offered by server 154.

The location may be expressed as a GPS coordinate of the first electronic gaming device, a location and/or description of the authorized gaming establishment, (for example, an authorized gaming establishment name, address, telephone number, web address, GPS coordinates, etc.), and/or a more detailed location of the first electronic gaming device inside the authorized gaming establishment, such as a floor where the first electronic gaming device is located (for example, $1^{st}$ floor, $2^{nd}$ floor, near $1^{st}$ elevator bank, near $5 slot machines, near exit #12, near front entrance, near rear entrance, $3^{rd}$ position in a "bank" of 6 electronic gaming devices, gaming area 4, etc.), X/Y mapping coordinates, polar coordinates, or virtually any other expression of a location. For example, the location of the first electronic gaming device may be expressed as: inside the MGM Grand Casino in Las Vegas, Nev., on the second floor, 35 feet from the nearest staircase and 15 feet from the nearest elevator. Or, the location may be expressed as simply: inside Caesar's Palace.

In one embodiment, the location of the first electronic gaming device may be determined by a position-determining device located within the first electronic gaming device, such as a GPS device. In another embodiment, the location of the first electronic gaming device may be determined by a portable GPS device carried by a technician employed by one or more of the authorized gaming establishments and/or a third party management company. In this embodiment, the technician may approach the first electronic gaming device and determine its position by observing an indication displayed by the technician's GPS device. The technician may then provide this information to server 154 by any number of ways, including electronically uploading the information to server 154 or entering the information using user interface 506, as described above. In another embodiment, a location of the first electronic gaming device may be provided to server 154 based on other information, such as a schematic diagram or blueprint of a layout of any of the authorized gaming establishments. In many cases, the location of each electronic gaming device in any authorized gaming establishment is determined manually, i.e., by measuring the distance of each electronic gaming device to certain stationary objects, such as walls, doorways, windows, etc. This information is typically entered into a software program used to simulate the physical layout of an authorized gaming establishment. Such software may be used, for example, in conjunction with a video monitoring system, jackpot payout alert, security system, player's reward card system, and/or other system where electronic gaming device layout and/or location may be useful. As such, the location information of the first electronic gaming device may be provided to server 154 electronically from the software program that stores the location information.

In other embodiments, the location of the first electronic gaming device is determined using an IP address or MAC address, previously described herein.

At block 702, the server determines a location of a second electronic gaming device in any one or more of the ways described above with respect to determining the location of the first electronic gaming device. The server may determine the location of other electronic gaming devices distributed in other authorized gaming establishments as well.

At block 704, server 154 receives an indication from the first electronic gaming device that a player of the first electronic gaming device wishes to participate in a game offered by the server. The indication is typically an electrical signal in analog or digital format, sent by the first electronic gaming device in response to a first player of the first electronic gaming device interacting with the first electronic gaming device.

For example, the first player may sit in front of the first electronic gaming device and press a button or touch a touchscreen associated with a player interface, such as player interface 304. The act of pressing the button or touchscreen is associated with initiating participation in a game offered by the first electronic gaming device, the server, or both. In one embodiment, the first player may press a button or the touchscreen associated with a game selection, such as jacks-or-better poker, Texas Hold 'Em, stud poker, roulette, bingo, keno, craps, or other games of chance and/or skill. In response to the first player pressing the selected button or touchscreen position, a processor within the first electronic gaming device, such as processor 300 of FIG. 3, generates an indication of the first player's desire to initiate game play of the particular selected game type. The indication may comprise an analog or digital electronic signal sent wirelessly or via electrically-conductive wire(s), or it may comprise a signal compatible with some other communication medium, such as fiber-optic cable, or any other medium.

In another embodiment, the indication described above may additionally comprise a further selection by the first player to further define his or her game selection. For example, the first player may use the player interface to select a game of Texas Hold 'Em, then select a particular set of betting limits, or stakes, related to a game of Texas Hold 'Em. For example, the first player may be provided a choice of betting limits of $1/$2, $3/$6, $5/$10, and $10/$20 betting limits, the first dollar amount in each pair representing a minimum and maximum bet per player turn during the first two rounds of play and the second dollar amount in each pair representing a minimum and maximum bet per player turn during the final two rounds of play. Other possible further selections by the first player, in addition to the stakes discussed above, comprise a maximum number of players at a virtual table, a minimum number of players at a virtual table, a location of other players, an identification of another player that is familiar to the first player, such as a friend or relative, and/or other selections.

At block 706, server 154 receives an indication from the second electronic gaming device that a player of the second electronic gaming device wishes to participate in the same game and/or other criteria as was selected by the first player at block 704. For example, if the first player selected a game of draw poker having stakes of $5 initial wagering and $10 for other rounds of wagering, the player operating the second electronic gaming device also selects draw poker having stakes of $5 initial wagering and $10 for other rounds of wagering.

At block 708, after receiving the first and second indications from the first and second electronic gaming devices, respectively, server 154 assigns the first player and the second player to either the same virtual game table or to different virtual tables associated with the selected game and/or other criteria. The technical details of assigning players to virtual tables by servers is well known in the art.

In one embodiment, the first player and the second player are assigned to different virtual tables if the first electronic gaming device is within a predetermined distance from the second electronic gaming device. This is to prevent collusion between the first player and the second player. If electronic gaming devices are located too close to one another, the first player and the second player could shuttle between terminals to view each other's virtual cards and gain an advantage over other players. In one embodiment, the predetermined distance is a minimum distance to ensure that one player cannot shuttle between another electronic gaming device playing at the same virtual table within a given time limit for each player to act as his or her turn comes due during game play.

For example, if the first electronic gaming device and the second electronic gaming device were both located on the second floor of authorized gaming establishment 110, spaced apart from one another by only 10 feet, a player of the first electronic gaming device could walk over to the second electronic gaming device and view the virtual cards assigned to the player of the second electronic gaming device, either with or without the knowledge and/or consent of the second player. Then, the first player could return to the first electronic gaming device and use the knowledge of the second player's virtual cards to gain an advantage over other players at the same virtual table. However, if the first and second electronic gaming devices were separated from one another by, for example, 100 feet, it would be difficult for the first player to go over to the second electronic gaming device, view the second player's virtual cards, and return to the first electronic gaming device in time to avoid a time-out associated with a maximum time period in which to act during game play. Thus, a predetermined distance may be selected on the basis of the distance between electronic gaming devices, determined from each electronic gaming device location, as determined in blocks 500 and 502.

In another example, a factor other than the distance between electronic gaming devices may be used to determine whether the first and second players may be assigned to the same virtual table. For example, if the first electronic gaming device is located on one floor of a multi-story authorized gaming establishment and the second electronic gaming device is located on a different floor than the first electronic gaming device, server 154 may use this information as the basis for assigning two players to the same virtual table or not. For example, if the first and second electronic gaming devices are located on the same floor, then server 154 may not assign players of the first and second terminals, respectively, to the same virtual table. However, if the first and second electronic gaming devices are, in fact, located on different floors, the server may assign players of the first and second terminals, respectively, to the same virtual table.

Another factor related to distance to be considered by server 154 when assigning players to virtual tables is whether or not electronic gaming devices are located within the same authorized gaming establishment. For example, if the first electronic gaming device is located within a first authorized gaming establishment and the second electronic gaming device is located within a second authorized gaming establishment, then server 154 may consider the two electronic gaming devices to be located greater than a predetermined distance whereby collusion would be difficult and/or impossible. Thus, merely identifying the authorized gaming establishment where electronic gaming devices are located may be enough location information to assign players to virtual tables. In one embodiment, no two players may be assigned to the same virtual table if they are playing electronic gaming devices located within the same authorized gaming establishment.

In another embodiment, server 154 may use the IP address and/or MAC address of electronic gaming devices to determine whether to assign players to the same virtual table. For example, server 154 may assign two players to the same virtual table only if their respective electronic gaming devices comprise IP addresses belonging to different sub-networks.

In other embodiments, a combination of location criteria may be used to determine whether the first and second players may be assigned to the same virtual table. For example, if the first electronic gaming device is located on a first floor of a casino and the second electronic gaming device is located on a second floor of the same casino, but both electronic gaming devices are near the same staircase, both the distance and the floor location of the first and second electronic gaming devices may be used to determine player table assignment. Thus, server 154 may not assign the first player and the second player to the same virtual table, even though they on different floors, if the distance between the first and second electronic gaming devices is within a predetermined distance. Said another way, server 154 may only assign the first and second players to the same virtual table if they are a) located on different floors and b) spaced apart from one another by a predetermined distance one would have to travel to get from the first electronic gaming device to the second electronic gaming device. Of course, other combinations of criteria could be used in the alternative.

At block 710, after players have been assigned to a virtual game table, the server may provide the location of each player playing at the assigned virtual game table to the other players at the same table. This may be accomplished by transmitting visual information, such as a map and/or textual information, to each of the players at the virtual game table.

At block 712, play begins, and the slot club card server begins tracking player activities related to game play. If a predetermined criterion is met, such as a number of hands played, a number of jackpots or tournaments won, a number of all-in bets made, a number of losing hands played, a number of losing hands in a row, and/or other criteria, an award may be given to any player who meets the criterion. Game play continues typically until the end of a round of play, where one or more winners are determined and wagers are settled in accordance with principles well-known in the art.

Figure 8:
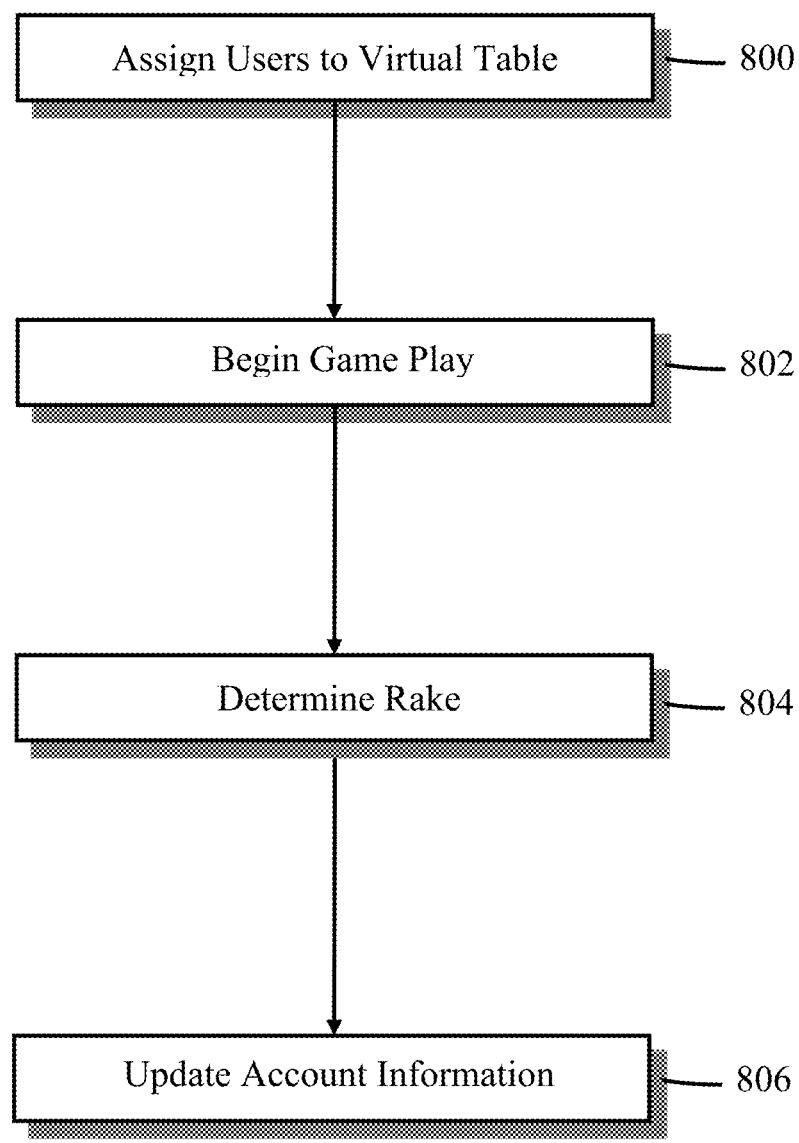
FIG. 8 is a flow diagram illustrating one embodiment of a method for providing network-based gaming between/among players located at two or more authorized gaming establishments.

FIG. 8 is a flow diagram illustrating one embodiment of a method for providing live-play, network-based gaming between/among players located at two or more authorized gaming establishments. The method is implemented by a processor, such as processor 500 shown in FIG. 5, located in server 154, as shown in FIG. 1, executing processor-readable instructions stored in a memory, such as memory 502 shown in FIG. 5. The server is typically electronically coupled to a plurality of electronic gaming devices distributed between/among two or more authorized gaming establishments, such as the ones shown in FIG. 1 located in, in this embodiment, authorized gaming establishments 106, 108, and 110. Server 154 may be located in any one of the authorized gaming establishments, or it could be placed at some other location, such as a third party management company.

In one embodiment, server 154 is electronically coupled to electronic gaming devices via intermediate servers, such as servers 134, 136, and/or 138. In another embodiment, server 154 is electronically coupled directly to the electronic gaming devices. In yet another embodiment, some electronic gaming devices are electronically coupled directly to server 154, while other electronic gaming devices are routed through an intermediate server.

It should be understood that in some embodiments, not all of the steps shown in FIG. 8 are performed and that the order in which the steps are carried out may be different in other embodiments. It should be further understood that some minor method steps have been omitted for purposes of clarity.

At block 800, server 154 assigns two or more players to a virtual table to play a game against one another, a house entity, or a combination of both, as described by the method shown in FIG. 7. For example, a first player playing on electronic gaming device 124 and a second player playing on electronic gaming device 118 could be assigned by server 154 to a first virtual poker table able to accommodate up to 10 players. For purposes of this example, it will be assumed that only the first and second players are assigned to the first virtual table.

At block 802, game play begins, typically by either the first or second player, or both, placing a wager known as a "blind" into the "pot", or proceeds from each round of game play. The blind serves as a minimum amount a player may win in a round of game play, for example, if there are no bets placed by any player during game play.

At block 804, processor 500 may determine a "rake", or "house cut", or a scaled commission that is paid to the "house" or authorized gaming establishment for each round of game play. In one embodiment, the rake is determined at a single point during game play, such as during a final betting round near the end of a round of game play. In other embodiments, the rake is determined at the end of each round of wagering during game play, or it may be determined at other points of time during game play.

Typically, the rake is determined as a percentage of the pot at one or more points of time during a round of game play. In a game of poker, the rake may range from 5%-10% of the pot at the conclusion of a round of game play, typically limited to a predetermined amount. In other embodiments, a percentage is not used to calculate the rake, but other methods may be used, such as using a fixed amount for each round of play, using the number of players at each virtual table, using a predetermined time period to take a predetermined amount, and/or using the number of players involved in a final round of betting, to name but a few examples.

Normally, the rake is paid to a house entity that is hosting the game. However, at block 804, the rake is divided between/among two or more authorized gaming establishments, a third party management company, and/or some other party. In one embodiment, the rake is divided in proportion to a number of players playing the game from each particular authorized gaming establishment. For example, if a virtual card table comprises two players operating two electronic gaming devices, respectively, located at a first authorized gaming establishment, three players operating three electronic gaming devices, respectively, from a second authorized gaming establishment, and three players operating three electronic gaming devices, respectively, from a third authorized gaming establishment, then processor 500 executes processor-readable instructions stored in memory 202 that causes server 154 to divide the rake by the total number of players currently active in game play on the virtual game table (in this case 8), and multiply this number by the number of players currently active on the virtual table at each authorized gaming establishment (in this case, the first authorized gaming establishment receives 2/8 or one-quarter of the rake, second authorized gaming establishment receives 3/8 or three-eighths of the rake, and third authorized gaming establishment also receives 3/8 or three-eighths of the rake). In another embodiment, a third party management company providing server 154 to the authorized gaming establishments may receive a portion of the rake as well, either as a set amount per round of play, a percentage of the pot, an amount based on time played, number of tables played, and/or other criteria.

In another embodiment, the rake is split between/among at least two or more authorized gaming establishments based on a predetermined contractual arrangement between/among the authorized gaming establishments. The split may be based on any one or more factors, such as the expected number of players over the course of a predetermined time period, the size of each authorized gaming establishment, the location of each authorized gaming establishment, etc.

At block 806, typically after a round of play has been completed and the rake determined for each authorized gaming establishment and/or others, server 154 may update an account related to each of the authorized gaming establishments and/or other parties. For example, processor 500 may update a first record stored in memory 500, representing an account balance of the first authorized gaming establishment, a second record stored in memory 500, representing an account balance of the second authorized gaming establishment, and a third record stored in memory 500, representing an account balance of the third authorized gaming establishment to reflect an increased account balance in accordance with each entity's portion of the rake.

Figure 10:
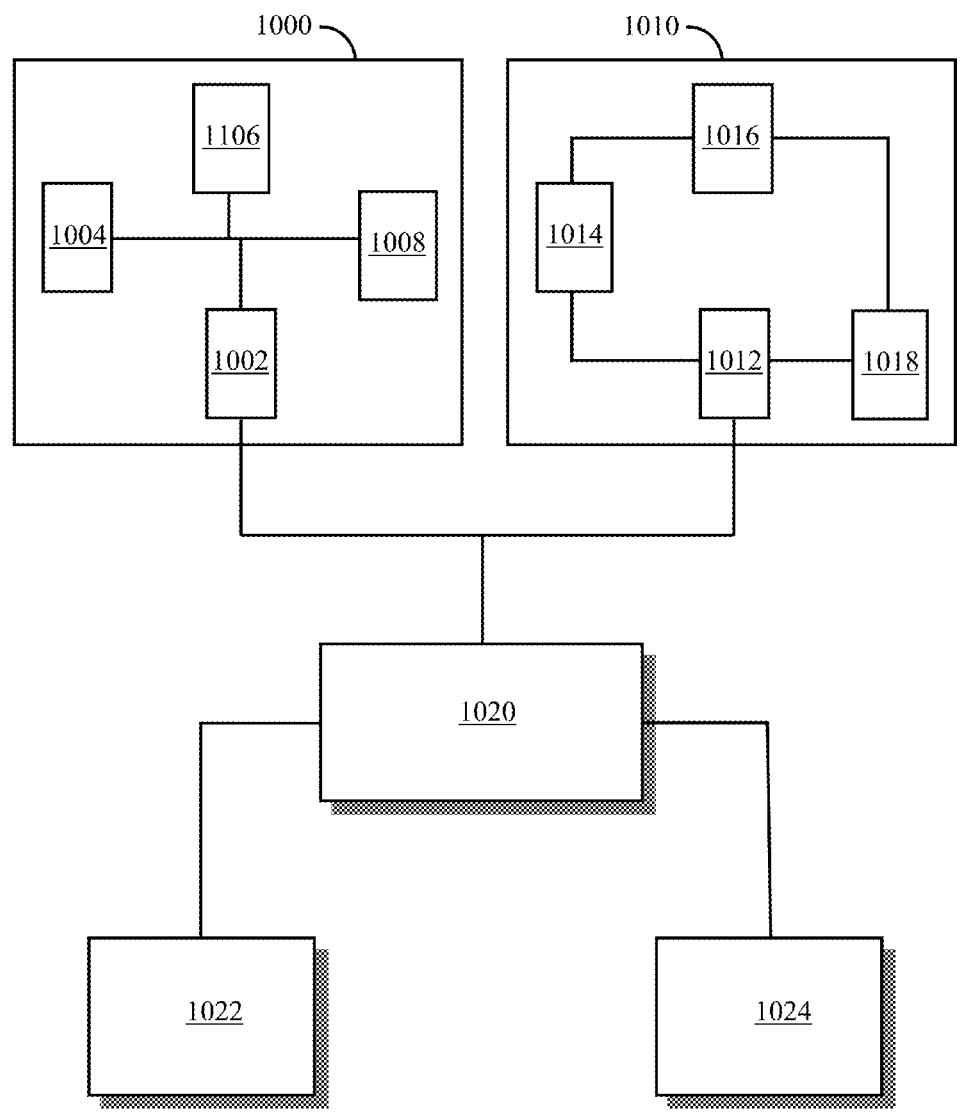
FIG. 10 shows one embodiment of a networked gaming system where financial reconciliation occurs between authorized gaming establishments.

FIG. 10 shows authorized gaming establishment 1000 comprising local server 1002 networked with electronic gaming devices 1004, 1006, and 1008 in a hub-and-spoke arrangement. Authorized gaming establishment 1010 comprises local server 1012 networked with electronic gaming devices 1014, 1016, 1018 arranged in a token network. Each of the electronic gaming devices in the authorized gaming establishments are electronically coupled to server 1020, which may reside at one of the authorized gaming establishments or at a third-party location. Server 1020 allows players located at authorized gaming establishment 1000 to play live games against players located at authorized gaming establishment 1010 using electronic gaming devices located at the respective authorized gaming establishments. Server 1020 may be coupled directly to the electronic gaming devices or it may communicate with them via the local servers 1002 and 1012.

Server 1020 is also shown electronically coupled to financial institutions 1022 and 1024, associated with authorized gaming establishment 1000 and authorized gaming establishment 1010, respectively. Although server 1020 is shown directly coupled to the financial institutions, it should be understood that server 1020 might be indirectly connected to the financial institutions, for example, via a wide area network such as the Internet. Each authorized gaming establishment is associated with a respective account held by the financial institutions, respectively. Each account is used to offset player winnings and losses as games are played using the electronic gaming devices, as described later herein.

It should be understood that although FIG. 10 illustrates only two authorized gaming establishments, each having a certain number of electronic gaming devices, in other configurations, almost any number of authorized gaming establishments could be coupled to sever 1020 so that players at those other authorized gaming establishments may play games among players located at the other authorized gaming establishments as well as authorized gaming establishments 1000 and 1010. An additional financial institution is typically associated with each other authorized gaming establishment, with an account held by the additional financial institutions for a respective additional authorized gaming establishment. In addition, it should be understood that one financial institution may hold accounts for more than one authorized gaming establishment.

Figure 11:
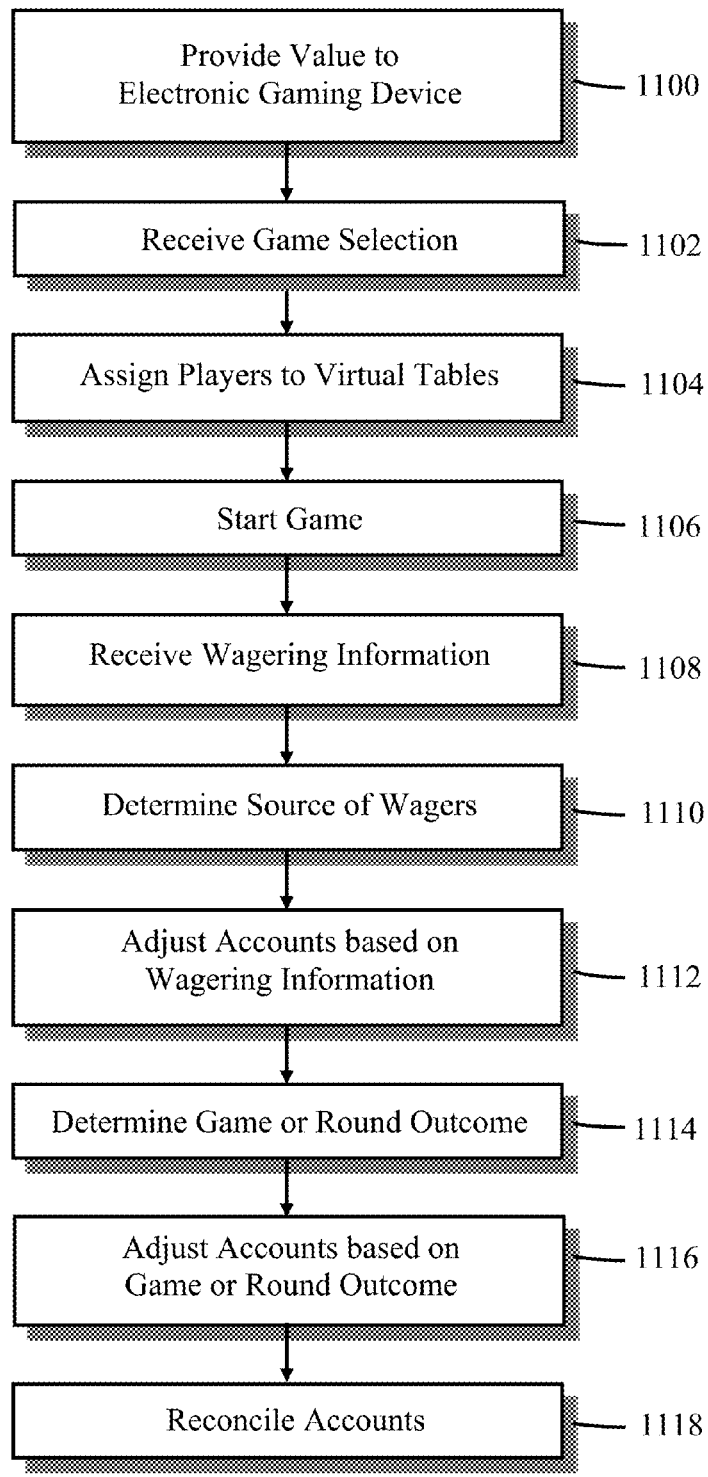
FIG. 11 is a flow diagram illustrating one embodiment of a method for financial management of a networked gaming system.

FIG. 11 is a flow diagram illustrating one embodiment of a method for financial management of a networked gaming system. It should be understood that in some embodiments, not all of the steps shown in FIG. 11 are performed and that the order in which the steps are carried out may be different in other embodiments. It should be further understood that some minor method steps have been omitted for purposes of clarity. During the discussion with regard to FIG. 11, references will be made to FIG. 10, which illustrates a networked gaming system in accordance with the teachings of FIG. 11.

At block 1100, at least one player at authorized gaming establishment 1000 begins playing a game against or with a player located at authorized gaming establishment 1010. For example, a first player begins game play by operating electronic gaming device 1004, while a second player begins game play by operating electronic gaming device 1014. In this example, each of the players is assigned to a virtual gaming table by server 1020. Server 1020 is responsible for providing a game to each of the players, for example, an electronic version of Texas Hold 'Em (or other variation of poker), Blackjack, craps, etc. Of course, other players may join the game with the first and second players, the other players located at authorized gaming establishments 1000, 1010, an/or another authorized gaming establishment. For example, a game of Texas Hold 'Em typically allows up to 10 players to play against each other.

The first player operating electronic gaming terminal 1004 typically begins game play by providing some form of value to electronic gaming terminal 1004. For example, the first player may insert paper currency into a bill validator 228, or a credit/debit card into card reader 218. In another embodiment, electronic gaming terminal 1004 comprises a paper voucher reader which reads code imprinted on a piece of paper or other medium, indicating an amount of credit, or an account balance, that the first player may use for wagering purposes during game play. The second player operating electronic gaming terminal 1014 begins game play the same way, inserting a form of value into electronic gaming terminal 1014.

An electronic representation of the value entered by the first and second players may be provided to servers 1002 and 1012, respectively.

After providing value to the electronic gaming terminals, each player may select a game offered by server 1020 and/or the player's respective electronic gaming terminal 1004 that allows the first player to play a "live" game against the second player and other players that join the game. Each player's selection is provided to sever 1020 at block 1102. At block 1104, server 1020 typically assigns players to a virtual gaming table in accordance with the type of game that the players have selected. In this example, the first and second players have chosen to play Texas Hold 'Em and, in response, server 1020 assigns the two players to the same virtual gaming table. Other players may also be added to the virtual gaming table in a similar manner.

At block 1106, server 1020 begins the game, typically be allowing the players to place an initial wager prior to a round of game play. For example, in Texas Hold 'Em, one player places an initial wager referred to as a "Big Blind" while a second player places a wager referred to as a "Small Blind". These wagers are placed prior to any player receiving game values from server 1020. In another embodiment, alternatively or in addition to an initial wager, one or more players may be required to provide an "ante" at one or more points during one or more rounds of play. The ante may be co-mingled with the rake, or be credited towards a particular authorized gaming establishment that requires such antes. An "ante" is poker stake usually put up before the deal to build the pot. In other words, it is typically a fixed, but arbitrary, stake put into the pot by each player before the deal.

The wagers placed by the players are received by server 1020 at block 1108, known as wagering information. The wagering information may comprise information such as a player identification code, authorized gaming establishment identification, an IP address, an electronic gaming device identification, etc. Server 1020 may store this information in memory 402.

As game play progresses, the players may place additional wagers, in accordance with the particular game being played. For example, in Texas Hold 'Em, after the Big Blind and Small Blind wagers have been received, server 1020, provides initial electronic card values to each of the players, representing two playing cards. After these two electronic card values are provided, a first round of wagering occurs, where players may place wagers, and/or call or raise other players' wagers. After that, three electronic card values are revealed to all of the players, corresponding to what is referred to in Texas Hold 'Em as "the flop", which represent common cards for all of the players to use to construct their respective hands. After the flop, another round of wagering occurs. After that, a fourth electronic card value representing a fourth common card is revealed to the players, known as "the river". A new round of betting is then conducted. Finally, a fifth common electronic card value is revealed to the players, and a final round of wagering occurs.

In another embodiment, wagering may take the form of predetermined betting amounts at predetermined points during game play. For example, in the Texas Hold 'Em example, players may be required to place bets of fixed amounts prior to the initial game values being provided, prior to the flop, prior to the turn, prior to the river, and after the river, if they wish to remain in the game. Similar predetermined, betting arrangements could be implemented in other types of poker games, or in other games in general.

In yet another embodiment, a single bet may be all that is required to complete a round of game play. For example, in a game of draw poker, only a single wager may be required, prior to a player receiving initial card values, in order for the player to play a round to completion.

The above embodiments may be combined with each other, or other wagering variations may be used, in accordance with knowledge generally known in the art.

At block 1110, server 1020 identifies an authorized gaming establishment associated with each wager after the wagering information is received at block 1108. In other words, as each wager is received from each of the players, server 1020 determines which of the authorized gaming establishments each wager originates. For example, if the first player at authorized gaming establishment 1000 places a bet of $10 during a round of game play, server 2010 determines that the bet originated at authorized gaming establishment 1000 from the wagering information received at block 1108.

At block 1112, server 1020 adjusts one or more account balances associated with one or more authorized gaming establishments in accordance with the wagering information received at block 1108. In one embodiment, after each wager is received at block 1108, server 1020 reduces an account balance associated with an authorized gaming establishment associated with each wager. Server 1020 maintains such accounts in memory 402. The account balance of any of the accounts may be adjusted as wagers are received from any players operating electronic gaming devices in the same authorized gaming establishment. For example, an account balance associated with authorized gaming establishment 1000 may be adjusted when a wager is received from a player playing a game of Texas Hold 'Em, but also when a wager is received from another player playing a game of networked blackjack, if the two players are each operating electronic gaming devices located at authorized gaming establishment 1000.

At block 1114, server 1020 determines a game outcome between/among the first player and the second player, and any other players participating in the game or the round of game play. In one embodiment, this may comprise server 1020 evaluating two or more electronic card hands and determining a winner based on the rules of poker. In another embodiment, it may comprise evaluating a player's electronic card hand to a "house" electronic card hand, and determine a winner between the player and the "house" in accordance with the rules of blackjack. Occasionally, there may be two or more winners in a particular round of game play, for instance, if a pot is split between two players having equal poker hands.

At block 1116, sever 1020 adjusts an account balance associated with the authorized gaming establishment where the winner(s) of the game or round of play is/are located. The adjustment typically comprises crediting the account balance in proportion to amounts wagered by other players during the game/round of play. In one embodiment, this means that the account balance is credited an amount equal to the total amounts wagered by the other game players. In another embodiment, the account balance is adjusted in an amount equal to the amounts wagered by other players, less a shared commission (known as the "rake") and/or less some other fee promulgated by one or more of the authorized gaming establishments and/or an owner/operator of server 1020, for example, an ante.

In one embodiment, the ante is not split between authorized gaming establishments during each round of game play. Rather, account balances of authorized gaming establishments that require an ante are adjusted each time an ante is received from a player operating an electronic gaming device located at such an authorized gaming establishment. For example, a first player may be playing networked poker at a first authorized gaming establishment located at a first authorized gaming establishment, while a second player may be playing against the first player at a second authorized gaming establishment located at a second authorized gaming establishment. The first authorized gaming establishment does not require an ante before each round of play. However, the second authorized gaming establishment requires a $0.25 ante from the second player prior to each round of play. In that case, as the ante is "received" by server 1020, server 1020 credits an account balance associated with the second authorized gaming establishment in the amount of the ante, e.g., $0.25.

At block 1118, server 1020 reconciles the account balances of the authorized gaming establishments stored in memory 402 with accounts held by the authorized gaming establishments at financial institutions 1022 and 1024. The purpose of the reconciliation is to restore a balance of funds from authorized gaming establishments that have a net loss during a given time period with gaming establishments that have a net gain during the given time period, with respect to their respective players' winnings and losses during the give time period from playing games using server 1020. The time period may comprise any period of time, such as a day, week, month, at the beginning or end of each month, or other convenient time period.

For example, in one embodiment, server 1020 reconciles accounts at the end of each month for three authorized gaming establishments. As numerous players at the three authorized gaming establishments place wagers during the month as they play a variety of games, the wagers are debited against three account balances stored by server 1020 in accordance with which authorized gaming establishment the wagers are being received. Each time that a player wins a game or round of play, the amount of the winnings are credited to the account balance associated with the authorized gaming establishment where the winning player is playing.

In one embodiment, players' winnings and losses are reconciled with the authorized gaming establishment where the player has participated in games, e.g., the authorized gaming establishment that provides the player's electronic gaming device. For example, when a player begins game play using electronic gaming device 1006 at authorized gaming establishment 1000, the player generally insets a form of value (e.g., cash, credit from a credit or debit card, voucher, etc.) into electronic gaming device 1006. The value that the player provides generally is credited directly with authorized gaming establishment 1000 or an account held at a financial institution on behalf of authorized gaming establishment 1000. At the conclusion of game play, if a player has won, e.g., received more winnings than value wagered during game play, the player may "cash out" and receive a form of value, such as cash, typically from a cashier's window inside authorized gaming establishment 1000. If the player has lost, e.g., wagered more than the player won during game play, the player may still receive a portion of his or her initial value that was provided to the electronic gaming device at the cashier's window, or, if the player has lost all of his or her initial value provided to electronic gaming device 1006, the player may simply walk away from authorized gaming establishment 1000 at the conclusion of game play.

In either case (e.g., player has won or player has lost), the authorized gaming establishment must account to the other authorized gaming establishments that participate in the networked gaming system, e.g., the networked gaming system of FIG. 10, for amounts won and lost by players participating in games managed by server 1020, e.g., inter-casino games. This is because, in one embodiment, a player's winnings come from players at other authorized gaming establishments while losses by a player at one authorized gaming establishment must be provided to a player at another authorized gaming establishment. In another embodiment where players play games against a "house entity", a reconciliation must occur between the authorized gaming establishment where the player is located (e.g., playing an electronic gaming device located at the authorized gaming establishment) and another authorized gaming establishment that acts as the opposing "house entity".

Figure 12:
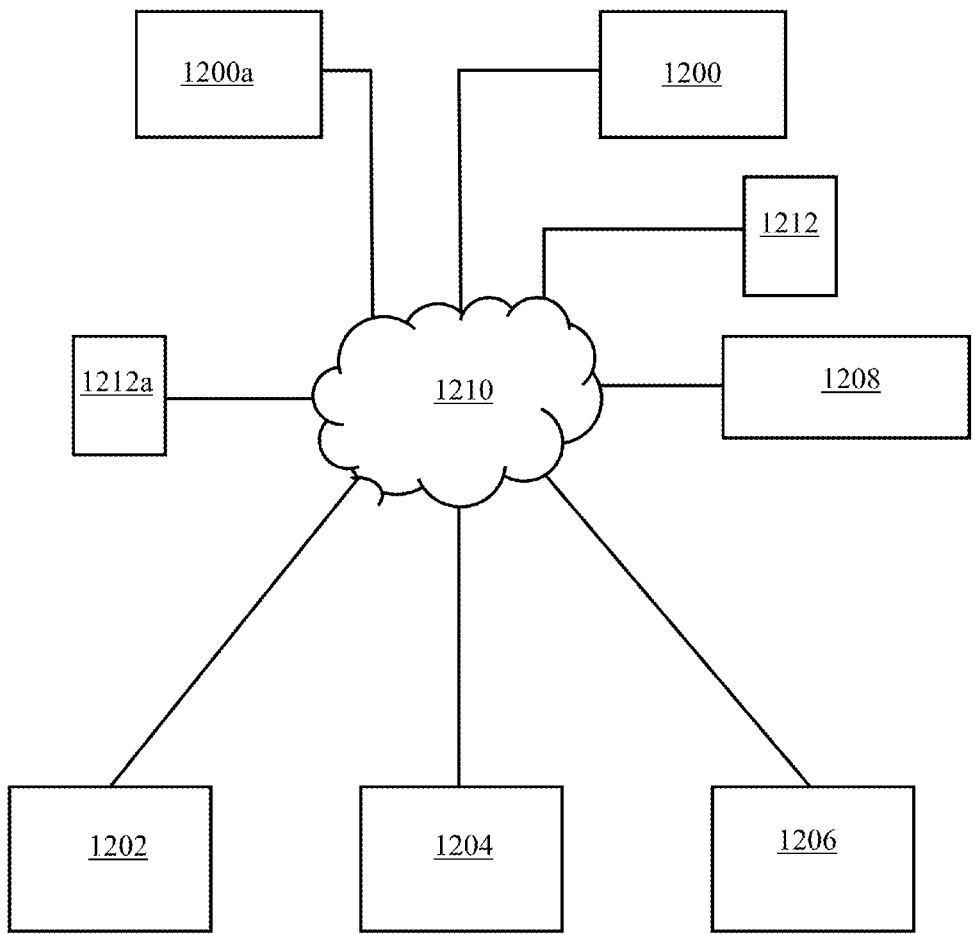
FIG. 12 is a functional illustration of a variation of the gaming system of FIG. 1, introducing an authorized authentication center.

FIG. 12 is a functional illustration of a variation of the gaming system of FIG. 1, introducing an authorized authentication center 1200. In this embodiment, authorized gaming establishments 1202, 1204, and 1206 communicate with central gaming server 1208 via network 1210 via well-known communication protocols, such as TCP/IP. Authorized gaming establishments 1202, 1204, and 1206 are equivalent to authorized gaming establishments 106, 108, and 110, discussed previously with respect to FIG. 1. Network 1210 is equivalent to network 140, also discussed above. Central gaming server 1208 acts as a central hosting center for game play among players located at authorized gaming establishments 1202, 1204, and 1206 and one or more authenticated remote game players, for example an individual located at home using a network-enabled electronic device 1212 and an individual located at home using network-enabled electronic device 1212*a*. Each network-enabled electronic device comprises one of a computer, tablet computer, smartphone, or the like, as will be discussed in greater detail below. The network-enabled electronic devices communicate with one or both authentication centers 1200 and 1200*a* via network 1210 and/or one or more other communication networks.

Authorized authentication centers 1200 and 1200*a* are facilities for authenticating individuals who wish to participate in live games offered by central gaming server 1208. Authentication is important because it provides a mechanism to ensure that players are actually who they purport to be, and that they meet minimum age requirements often required by federal, state, and/or local regulations. Although FIG. 12 shows only two authorized authentication centers, in practice, almost an unlimited number of authorized authentication centers could exist.

One or more entities may authorize authentication center 1200 and 1200*a* to provide authentication services on behalf of central gaming server 1208, one or more of the authorized gaming establishments, and/or one or more regulatory agencies. Such authorization typically includes a contractual relationship between an authorizing party and the authorized authentication centers, ensuring that each authorized authentication center follows certain minimum authentication procedures determined by central gaming server 1208, one or more of the authorized gaming establishments, one or more regulatory agencies, and/or the authorized authentication centers themselves.

Authentication generally comprises an initial "registration" process, where individuals provide authentication credentials to authorized authentication center 1200 and/or 1200*a*, whereupon authorized authentication center 1200 and/or 1200*a* creates an authentication record in a memory controlled by authorized authentication center 1200 and/or 1200*a*. After this initial registration process has occurred, individuals may request to participate in playing live games in a session offered by gaming server 1208 by sending authentication information to authorized authentication center 1200 or 1200*a* via a respective network-enabled electronic device operated by respective individuals, such as fixed or mobile computers, tablet computers, smartphones, or other devices. The authentication information sent by individuals requesting to participate in playing live games in a session to authorized authentication center 1200 or 1200*a* generally comprises information that may be compared to the authentication information received and stored in memory by authorized authentication center 1200 or 1200*a* during the initial registration process. If a match is determined between the authentication information stored in the memory and the authentication information received from an individual at the time of request for participation in a live play session, then the requesting individual is granted access to gaming server 1208 so that the individual may participate in live game play with players located at authorized gaming establishments, e.g., authorized gaming establishments 1202, 1204, and 1206, and/or other authenticated game participants not located at an authorized gaming establishment, but participate at non-gaming locations by virtue of being authenticated by an authorized authentication center.

Authorized authentication center 1200 and/or 1200*a* may comprise an authorized gaming establishment similar to authorized gaming establishments 1202, 1204, and 1206. However, authorized authentication center 1200 and/or 1200*a* may be located a great distance from these establishments, for example, in another county, state, or even another country.

In other embodiments, authorized authentication center 1200 and/or 1200*a* comprises a non-gaming establishment that provides authentication services on behalf of central gaming server 1208. In this example, authorized authentication center 1200 and/or 1200*a* may comprise a service center where individuals can visit and present any required authentication information to an authorized authentication center representative, or, in other embodiments, a self-serve kiosk having the capability to query, receive, and store authentication information provided by individuals. Individuals may be required to provide identification, such as a driver's license or passport, and/or other kinds of authentication information such as a visual image of an individual's face, a voice sample, one or more fingerprints, a palm print or scan of one or moth palms, an image of a body part, such as of an individual's retina, and/or other information that may be used to authenticate the individual in subsequent interactions with authorized authentication center 1200 and/or 1200*a*.

Figure 13:
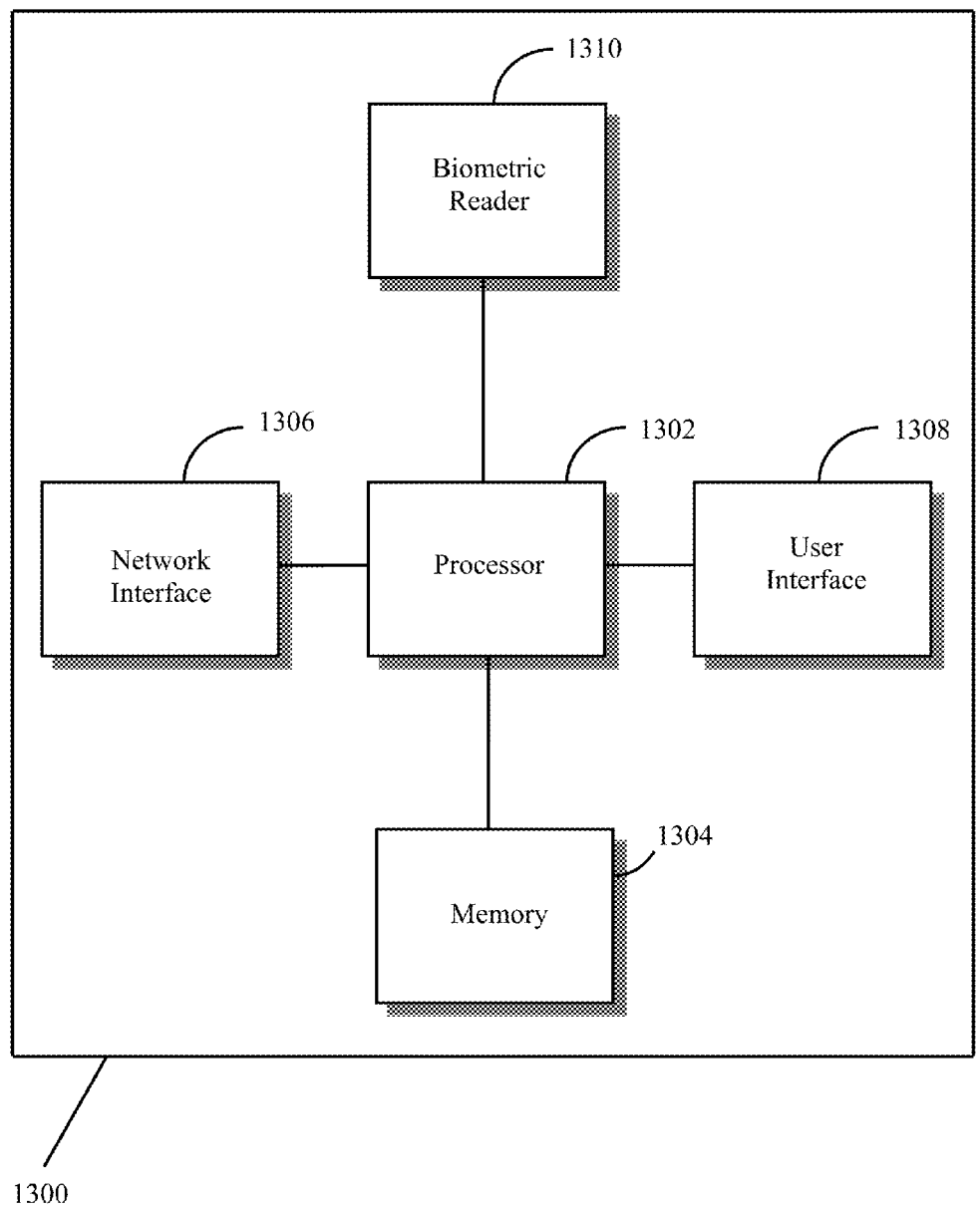
FIG. 13 is a functional block diagram of one embodiment of an authentication server located at an authorized authentication center.

FIG. 13 is a functional block diagram of one embodiment of an authentication server 1300 located at authorized authentication center 1200 or 1200*a*. Authentication server 1300 typically comprises a processor 1302, a memory 1304, a network interface 1306, a user interface 1308, and a biometric reader 1310. The authentication sever 1300 may take the form of a computer, application server, web server, or other electronic device that allows registration of remote players and authentication services for individuals requesting to play live games offered by central gaming server 1208. It should be understood, however, that in other embodiments, registration could be provided by one set of hardware/software/firmware, while authentication could be provided by another set of hardware/software/firmware, each set of hardware/software/firmware located nearby one another or not.

Processor 1302 comprises a general-purpose microprocessor well known in the art or it may comprise a custom or semi-custom ASIC able to carry out the functionality required for game play. Processor 1302 generally executes processor-executable instructions stored in one or more mediums, such as memory 1304, that control most or all of the functionality of the server. Examples of memory 1304 include one or more electronic memories such as RAM, ROM, hard drives, flash memory, EEPROMs, EPROMs, etc.

Network interface 1306 comprises hardware and/or software configured to receive and process electronic communications from one or more communication networks, such as the Internet, a fiber optic network, a radio network, a wired or wireless telephone network, a satellite network, a wired or wireless data network, and/or any other well-known, two-way communication networks. The communications comprise requests from persons using a network-enabled electronic device, such a desktop or laptop computer, tablet computer, smartphone, etc., connected to network 1210, to participate in games offered by central gaming server 1208. The communications could also comprise network traffic related to game play as a participant of the gaming network managed by central gaming server 1208.

User interface 1308 generally comprises hardware and/or software necessary for allowing a user, such as a customer service representative, who has authority to create authentication records on behalf of individuals wishing to participate in games offered by central gaming server 1208. User interface 1308 may also allow individuals to create authentication records for themselves without the use of a customer service representative in certain circumstances. In other embodiments, user interface 1308 comprises a personal electronic device, such as a smartphone or tablet computer, used by a person to provide authentication information to authentication server 1300. In those embodiments, the personal electronic device may comprise a camera, fingerprint reader, palm reader, retinal scanner, microphone, etc., allowing authentication information of the person seeking registration to provide such information to authentication server 1300.

User interface 1308 typically comprises a keyboard, keypad, push-buttons, switches, a video display, a touch-screen device, a card reader, a microphone, an image capture device such as a still camera or video camera, a coin and/or bill acceptor, a speaker, a ticket printer, an RS-232 port, a USB port, a card reader, a network port, and/or virtually any other device that allows a person to provide information to, or receive information from, processor 1302.

Biometric reader 1310 comprises an electronic device capable of capturing physical traits of people. Typically, these traits are captured and then converted into one or more digital formats. Biometric reader 1310 may comprise one or more of a camera, an audio capture mechanism such as a microphone, a fingerprint scanner, palm scanner, a retinal scanner, or any other device to capture a physical human trait. Biometric reader 1310 provides electronic representations of traits to processor 1302, where the representations may be further processed, or simply stored in an authentication record.

Figure 14:
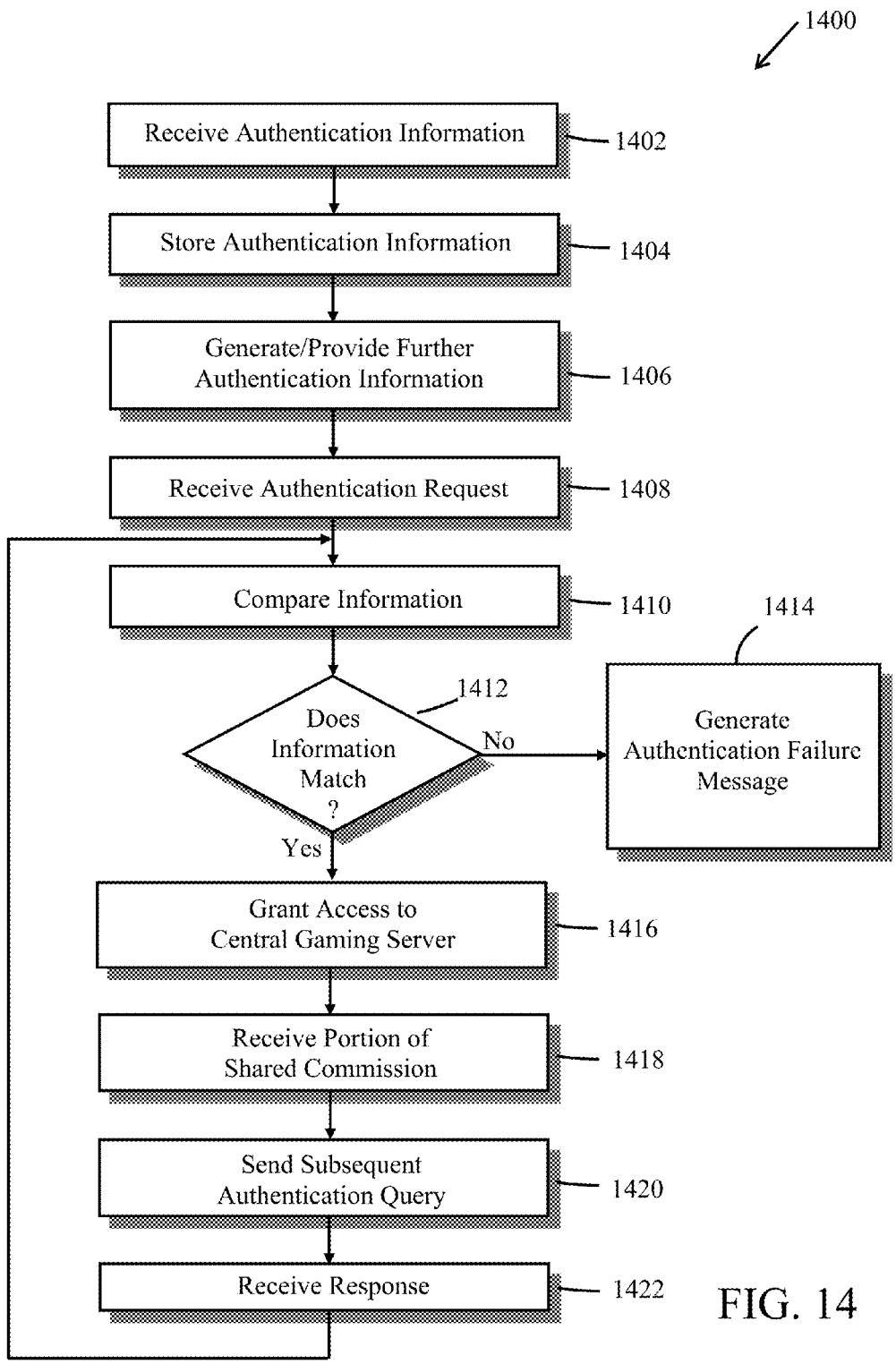
FIG. 14 is a flow diagram illustrating one embodiment for allowing remote players to participate in the live gaming network shown in FIG. 1.

FIG. 14 is a flow diagram illustrating one embodiment of a method 1400 for allowing remote players to participate in games offered by central gaming server 1208. The method is implemented by a processor, such as processor 1302 shown in FIG. 13, located in authentication server 1300, executing processor-readable instructions stored in a memory, such as memory 1304 shown in FIG. 13. The authentication server is typically electronically coupled to a network, such as network 1210. It should be understood that in some embodiments, not all of the steps shown in FIG. 14 are performed and that the order in which the steps are carried out may be different in other embodiments. It should be further understood that some minor steps in this method have been omitted for purposes of simplicity.

At block 1402, authentication server 1300 conducts an initial registration process on behalf of an individual wishing to participate in live game play offered by central gaming server 1208. The initial registration process collects user authentication information for later comparison to authentication information provided at a subsequent time, in order to authenticate individuals wishing to participate in live games offered by gaming server 1208.

The initial registration process comprises an interaction between an individual and authentication server 1300 either directly through user interface 1308, or with a human representative of the authentication server. In the latter case, the human representative interfaces with authentication server 1300 via user interface 1308.

The individual provides authentication information to authentication server 1300 directly, or through the customer service representative, such as a visual representation of the individual or a visual representation of a portion of the individual, such as the individual's face, a driver's license, a passport, or other government-issued identification, a username, a password, an address, an email address, a telephone number, a credit card number, a social security number, a voice recording, a fingerprint, palm print, an iris scan, and/or other information that may be useful in authenticating an individual. Additionally, the individual may provide bank information for electronic transfer of funds to and from the individual's bank account for use in game play.

At block 1404, authentication server stores the authentication information received from the individual, typically by creating an authentication record and storing the authentication record in memory 1304.

At block 1406, processor 1302 may generate further authentication information based on the input received at block 1402, and provide it to the individual. The further authentication information may be used by the individual in future transactions with authentication server 1300 to further authenticate the individual. For example, the further authentication information generated by processor 1302 and provided to the individual may comprise a username, password, and/or a unique code that further serves to identify the individual. The further authentication information may also comprise a physical device such as a security token, also otherwise known as hardware token, a hardbad token, an authentication token, a USB token, a cryptographic token, or a key fob. The token may be used by the individual to provide a code to authentication server 1300 during a subsequent interaction between the individual and authentication server 1300 when the individual requests participation in live games offered by central gaming server 1208.

The further authentication information may be provided to the individual via user interface 1308, or it may be provided to a human representative of authentication server 1300 for presentation to the individual by the human representative. Alternatively, or in addition, the further authentication information is provided to the individual via email, text message, or other electronic delivery means to a network-enabled device owned and/or operated by the individual.

At some subsequent time after successful registration by the individual at blocks 1402 through 1406, the individual may wish to participate in a live game offered by central gaming server 1208. The individual is typically located remotely from authorized authentication center 1200 and authorized gaming establishments 1202, 1204, and 1206, for example, inside the individual's home, office, or virtually any other location having access to network 1210. Thus, at block 1408, the individual generates an authentication request using a network-enabled device and sends the request to authentication server 1300 via network 1210. The authentication request initiates an authentication process between the individual and authentication server 1300. Typically, the authentication request comprises authentication information provided by the individual, such as a username, password, a code generated by a security token in possession of the individual, a digital image of the individual or part of the individual, a voice sample, a digital representation of a fingerprint, palm print image, a digital image of the individual's retina, and/or other authentication information. In another embodiment, the authentication information provided by the individual is sent in one or more messages to authentication server 1300 in one or more subsequent messages to the authentication request. At block 1408, the authentication request is received at authentication server 1300.

At block 1410, authentication information contained in the request, or in subsequent messages, is compared against authentication information stored in memory 1304, previously submitted by the individual, to determine whether the individual submitting the request is who he or she purports to be.

At block 1412, processor 1302 determines whether the comparison at block 1410 was successful, e.g., whether the authentication information in the request and/or subsequent messages matches the authentication information previously provided by the individual and stored in memory 1304. If a match is determined, processing continues to block 1416. If a match is not determined, processing continues to block 1414, where processor 1302 may generate a message indicating that the request has failed, and provide the message to the individual who sent the request via network 1210.

At block 1416, upon a successful comparison of the authentication information at block 1412, processor 1302 grants access of central gaming server 1208 to the individual who sent the request. In one embodiment, granting access comprises connecting the individual's network-enabled electronic device to central gaming server 1208 via a connection through authentication center 1200. For example, authentication server 1300 may provide a virtual private network (VPN) connection to the individual's network-enabled electronic device so that the individual may participate in live games offered by central gaming server 1208. In this embodiment, as the individual interacts with central gaming center 1208, data packets sent and received between the individual's network-enabled electronic device and central gaming server 1208 are routed though authentication center 1200. In another embodiment, data packets received from the individual's network-enabled electronic device are re-directed by processor 1302 using techniques well-known in the art.

In another embodiment, granting access to the individual at block 1416 comprises sending the individual a code, such as a cryptographic code or, simply, an alpha-numeric string, that the individual uses to access central gaming server 1208. In this embodiment, processor 1302 may send the code to central gaming server 1208 along with information identifying the particular individual that was authenticated at blocks 1410 and 1412, so that central gaming server 1208 may compare the code and identifying information from authentication server 1300 to a subsequent request from the individual to access central gaming server 1208. The subsequent request from the individual comprises the code provided to the individual by authentication server 1300. Upon receiving the request from the individual, central gaming server 1208 compares the code received from the individual to the code received from authentication server 1300. If a match is found, central gaming server 1208 grants access to the individual so that the individual may use his or her network-enabled electronic device to play live games offered by central gaming server 1208 against other, live players located at authorized gaming establishments such as 1202, 1204, and/or 1206, and/or against other players located at non-gaming establishments that have been authenticated by authentication server 1300. In this embodiment, data packets sent and received between the individual's network-enabled electronic device and central gaming server 1208 are routed directly to one another via network 1210, or some intervening communication network.

At block 1418, after the individual has been granted access to central gaming server 1208 at block 1416, authentication server 1300 may receive a scaled commission calculated by central gaming server 1208, as described above with respect to any of FIGS. 6-8 and/or 11, above. The scaled commission is shared among any authorized gaming establishment having a player participating in the live game being played by the individual, authorized authentication center 1200, and/or other authorized authentication centers having a player participating in the live game being played by the individual. Authentication server 1300 may be notified of receipt or credit of the scaled commission after completion of each round of play involving any individuals that were authenticated by authentication server 1300, at predefined time intervals, such as once per day, week, or month, and/or upon the occurrence of one or more predetermined events, such as a large sum of money won by an individual that was authenticated by authentication server 1300, a large number of individuals presently playing games via central gaming server 1208 and authenticated by authentication server 1300, or some other predetermined event.

After the individual has been granted access to central gaming server 1208 at block 1416, authentication server 1300 may send one or more subsequent authentication requests to the individual to ensure that the individual who was authenticated at blocks 1410 and 1412 continues to be the individual who is playing games using central gaming server 1208, shown at block 1420. In another embodiment, one or more of these subsequent authentication requests are sent by central gaming server 1300 to the individual. Each of the subsequent authentication requests comprise a request for the individual to re-authenticate him or herself to authentication server 1300 and/or central gaming server 1208, by providing one or more of the authentication information provide to authentication server 1300 at blocks 1402 and 1404. Alternatively, or in addition, the subsequent authentication request comprises a code generated and sent by server 1300 or central gaming server 1208 to a security token that was issued to the individual by authentication center 1200 at block 1406. The subsequent authentication request may be sent at regular time intervals, at random time intervals, and/or upon the occurrence of a predetermined event, such as an individual winning a predetermined amount of money, winning a predetermined percentage of games played, winning a predetermined number of games, determining that the individual has changed his or her location, or some other metric.

At block 1422, a response to the subsequent authentication request sent at block 1420 is received by authentication server 1300 or gaming server 1208 as the case may be. The response comprises at least some of the authentication information requested in the subsequent authentication request and/or the code that was sent to the individual's security token. Processing then continues back to block 1410, where information in the response is compared to authentication information in memory 1304 to determine if a match exists, and to grant or deny further access to central gaming server 1300 at block 1412 depending upon the results of the match.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an electronic gaming device. In the alternative, the processor and the storage medium may reside as discrete components.

Accordingly, an embodiment of the invention may comprise a non-transitory processor-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method implemented by an authorized authentication center for allowing remote players to participate in live games offered by a central gaming server, the method comprising:
   receiving authentication information from a person wishing to participate in the live games offered by the central gaming server;
   storing the authentication information in a memory;
   receiving an authentication request from an individual over a network interface, the authentication request comprising authentication information sent by the individual wishing to participate in the live games;
   comparing the authentication information in the authentication request to the authentication information in the memory by a processor;
   granting access to the central gaming server if the authentication information in the authentication request matches the authentication information in the memory; and
   receiving a scaled commission determined by the central gaming server, the scaled commission paid by the central gaming server in exchange for the authorized authentication center authenticating the individual, the scaled commission comprising a portion of a fee received from the authenticated individual and other game players during game play;
   wherein granting access to the individual who sent the authentication request comprises re-directing data packets received from the authenticated individual to the central gaming server.

2. The method of claim 1, wherein the scaled commission is shared among any authorized gaming establishment having a player participating in one of the live games offered by the central gaming server and the authorized authentication center.

3. The method of claim 1, wherein the scaled commission is shared among the authorized authentication center and one or more other authorized authentication centers each having authenticated at least one player participating in one of the live games offered by the central gaming server.

4. The method of claim 1, further comprising:
   generating further authentication information in response to receiving the authentication information from the person wishing to participate in the live games; and
   providing the further authentication information to the person.

5. The method of claim 1, further comprising:
   sending a subsequent authentication request to the individual after the individual has been granted access to the central gaming server;
   receiving a response to the subsequent authentication request;
   comparing information in the response to the authentication information stored in the memory; and
   denying access to the central gaming server if at least some of the information in the response does not match at least some of the information stored in the memory.

6. The method of claim 5, wherein the subsequent authentication request is sent to the individual upon the occurrence of a predetermined event.

7. The method of claim 5, wherein the subsequent authentication request is sent to the individual at random time intervals.

8. A method implemented by an authorized authentication center for allowing remote players to participate in live games offered by a central gaming server, the method comprising:
   receiving authentication information from a person wishing to participate in the live games offered by the central gaming server;
   storing the authentication information in a memory;
   receiving an authentication request from an individual over a network interface, the authentication request comprising authentication information sent by the individual wishing to participate in the live games;
   comparing the authentication information in the authentication request to the authentication information in the memory by a processor;
   granting access to the central gaming server if the authentication information in the authentication request matches the authentication information in the memory; and
   receiving a scaled commission determined by the central gaming server, the scaled commission paid by the central gaming server in exchange for the authorized authentication center authenticating the individual, the scaled commission comprising a portion of a fee received from the authenticated individual and other game players during game play;
   wherein granting access to the individual who sent the authentication request comprises:
      providing a first code to the individual for use in connecting directly with the central gaming server; and
      providing a second code to the central gaming server, the second code equal to the first code, for the central gaming center to compare the first code to the second code as the second code is provided to the central gaming server by the authenticated individual and for allowing the authenticated individual access to the central gaming server if the first code matches the second code.

9. The method of claim 8, wherein the scaled commission is shared among any authorized gaming establishment having a player participating in one of the live games offered by the central gaming server and the authorized authentication center.

10. The method of claim 8, wherein the scaled commission is shared among the authorized authentication center and one or more other authorized authentication centers each having authenticated at least one player participating in one of the live games offered by the central gaming server.

11. An apparatus for allowing remote players to participate in live games offered by a central gaming server, the apparatus comprising:
   a memory for storing processor-executable instructions and for storing authentication information from a person wishing to participate in the live games offered by the central gaming server;
   a processor for executing the processor-executable instructions that, when executed by the processor, cause the apparatus to:

receive the authentication information from the person wishing to participate in the live games offered by the central gaming server;

store the authentication information in the memory;

receive an authentication request from an individual over a network interface, the authentication request comprising authentication information sent by the individual wishing to participate in the live games;

compare the authentication information in the authentication request to the authentication information in the memory by a processor; and grant access to the central gaming server if the authentication information in the authentication request matches the authentication information in the memory;

receive a scaled commission determined by the central gaming server, the scaled commission comprising a portion of a fee imposed on the authenticated individual and other game players by the central gaming server, the scaled commission provided by the central gaming server as compensation for authenticating the individual;

and a network interface for sending and receiving information between the apparatus and the individual;

wherein the instructions that cause the apparatus to grant access to the individual comprise instructions that cause the apparatus to re-direct data packets received from the authenticated individual to the central gaming server.

12. The apparatus of claim 11, wherein the scaled commission is shared among any authorized gaming establishment having a player participating in one of the live games offered by the central gaming server and the authorized authentication center.

13. The apparatus of claim 11, wherein the scaled commission is shared among the authorized authentication center and one or more other authorized authentication centers each having authenticated at least one player participating in one of the live games offered by the central gaming server.

14. The apparatus of claim 11, wherein the processor-executable instructions further comprise instructions that cause the apparatus to:

generate further authentication information in response to receiving the authentication information from the person wishing to participate in the live games; and provide the further authentication information to the person.

15. The apparatus of claim 11, wherein the processor-executable instructions further comprise instructions that cause the apparatus to:

send a subsequent authentication request via the network interface to the individual after the individual has been granted access to the central gaming server;

receive a response to the subsequent authentication request via the network interface;

compare information in the response to the authentication information stored in the memory; and deny access to the central gaming server if at least some of the information in the response does not match at least some of the information stored in the memory.

16. The apparatus of claim 15, wherein the subsequent authentication request is sent to the individual upon the occurrence of a predetermined event.

17. The apparatus of claim 15, wherein the subsequent authentication request is sent to the individual at random time intervals.

18. An apparatus for allowing remote players to participate in live games offered by a central gaming server, the apparatus comprising:

a memory for storing processor-executable instructions and for storing authentication information from a person wishing to participate in the live games offered by the central gaming server;

a processor for executing the processor-executable instructions that, when executed by the processor, cause the apparatus to:

receive the authentication information from the person wishing to participate in the live games offered by the central gaming server;

store the authentication information in the memory;

receive an authentication request from an individual over a network interface, the authentication request comprising authentication information sent by the individual wishing to participate in the live games;

compare the authentication information in the authentication request to the authentication information in the memory by a processor; and grant access to the central gaming server if the authentication information in the authentication request matches the authentication information in the memory;

receive a scaled commission determined by the central gaming server, the scaled commission comprising a portion of a fee imposed on the authenticated individual and other game players by the central gaming server, the scaled commission provided by the central gaming server as compensation for authenticating the individual;

and a network interface for sending and receiving information between the apparatus and the individual;

wherein the instructions that cause the apparatus to grant access to the individual comprise instructions that cause the apparatus to:

provide a code to the individual for use in connecting directly with the central gaming server; and provide a second code to the central gaming server, the second code equal to the first code, for the central gaming center to compare the first code to the second code as the second code is provided to the central gaming server by the authenticated individual and for allowing the authenticated individual access to the central gaming server if the first code matches the second code.

19. The apparatus of claim 18, wherein the scaled commission is shared among the authorized authentication center and one or more other authorized authentication centers each having authenticated at least one player participating in one of the live games offered by the central gaming server.

20. The apparatus of claim 18, wherein the processor-executable instructions further comprise instructions that cause the apparatus to:

generate further authentication information in response to receiving the authentication information from the person wishing to participate in the live games; and provide the further authentication information to the person.

* * * * *